(12) United States Patent
Paulsson

(10) Patent No.: US 6,568,501 B2
(45) Date of Patent: May 27, 2003

(54) RECEIVER ARRAY USING TUBING CONVEYED PACKER ELEMENTS

(75) Inventor: Björn N. P. Paulsson, Fullerton, CA (US)

(73) Assignee: Paulsson Geophysical Services, Inc., Brea, CA (US)

( * ) Notice: Subject to any disclaimer, the term of this patent is extended or adjusted under 35 U.S.C. 154(b) by 11 days.

(21) Appl. No.: 09/789,327

(22) Filed: Feb. 20, 2001

(65) Prior Publication Data

US 2001/0030076 A1 Oct. 18, 2001

Related U.S. Application Data

(63) Continuation-in-part of application No. 09/394,465, filed on Sep. 11, 1999, now Pat. No. 6,206,133, which is a continuation-in-part of application No. 09/038,856, filed on Mar. 11, 1998, now Pat. No. 5,962,819.

(51) Int. Cl.[7] .................................................. G01V 1/40
(52) U.S. Cl. ........................................ 181/102; 166/206
(58) Field of Search .................................. 181/102, 103, 181/104, 105, 106, 108, 113, 114; 166/206, 207, 212; 367/25

(56) References Cited

U.S. PATENT DOCUMENTS

| | | | | |
|---|---|---|---|---|
| 3,690,166 A | * | 9/1972 | Grice | .......................... 181/102 |
| 4,428,422 A | * | 1/1984 | Laurent | ....................... 166/206 |
| 5,111,903 A | * | 5/1992 | Meynier | ...................... 181/102 |
| 5,864,099 A | * | 1/1999 | Wittrisch et al. | ........... 181/102 |

* cited by examiner

Primary Examiner—Khanh Dang
(74) Attorney, Agent, or Firm—John S. Reid; Reidlaw, L.L.C.

(57) ABSTRACT

A clamped receiver array using tubing conveyed packer elements is disclosed and described. The receiver array can be used for borehole seismology as well as marine bottom surface seismology. The receiver array has a plurality of receivers connected together by a signal cable. The apparatus is further provided with a fluid conduit running essentially parallel to the signal cable. The fluid conduit has a plurality of receiver deployment sections which are located proximate to respective receivers. The receiver deployment sections are responsive to an increase in pressure within the fluid conduit, causing the receiver deployment sections to operate to press the receiver against the inside of a wellbore or to a marine bottom surface. In one example the receiver deployment section uses pistons disposed in openings in the fluid conduit to push the receivers away from the conduit as pressure in the conduit is increased.

21 Claims, 14 Drawing Sheets

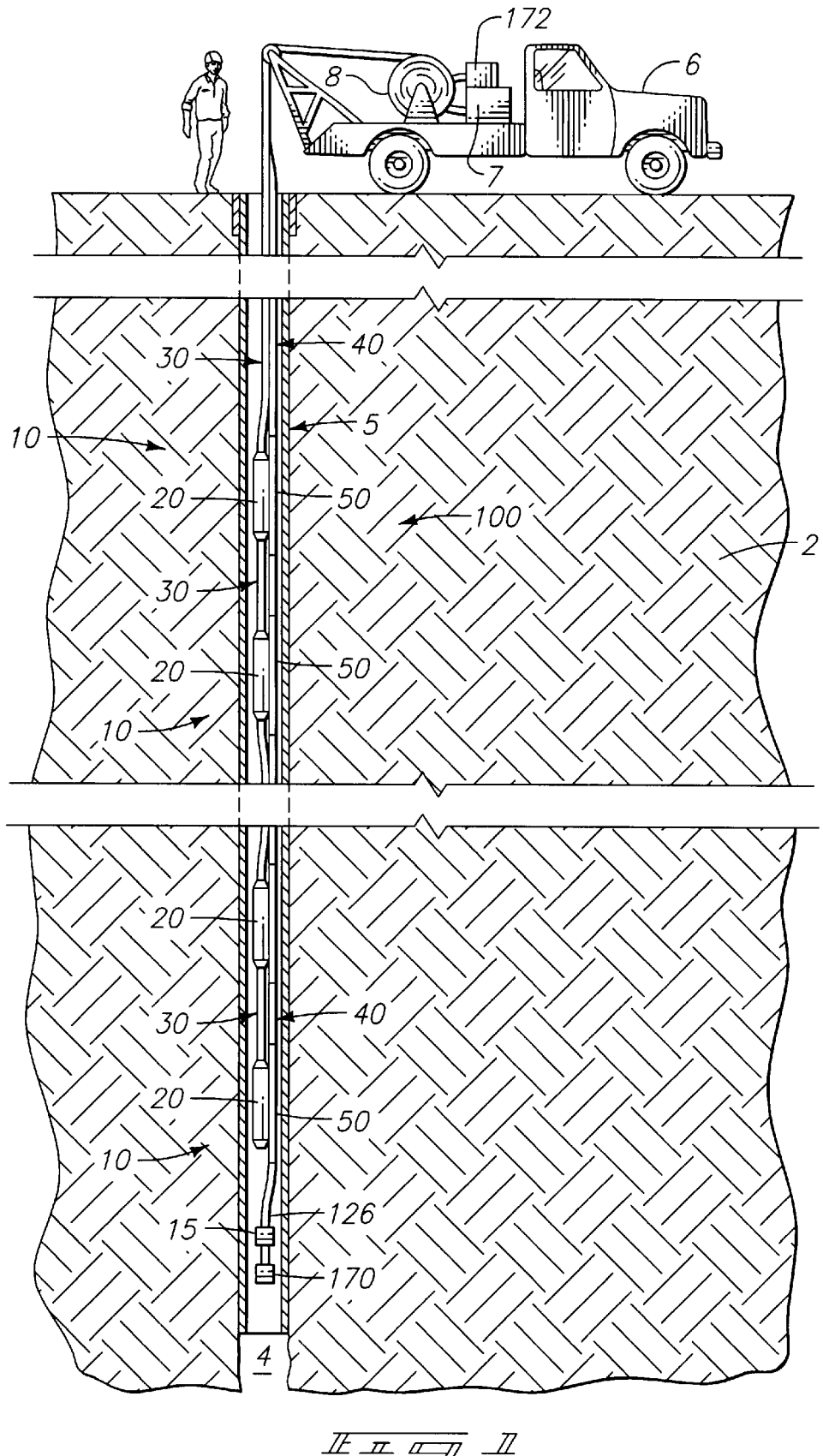

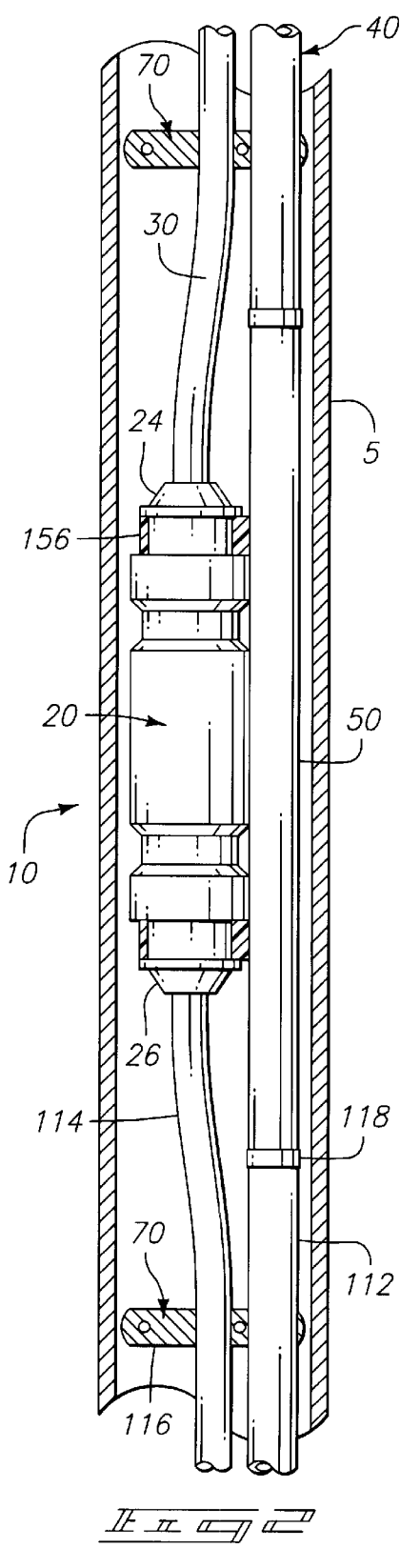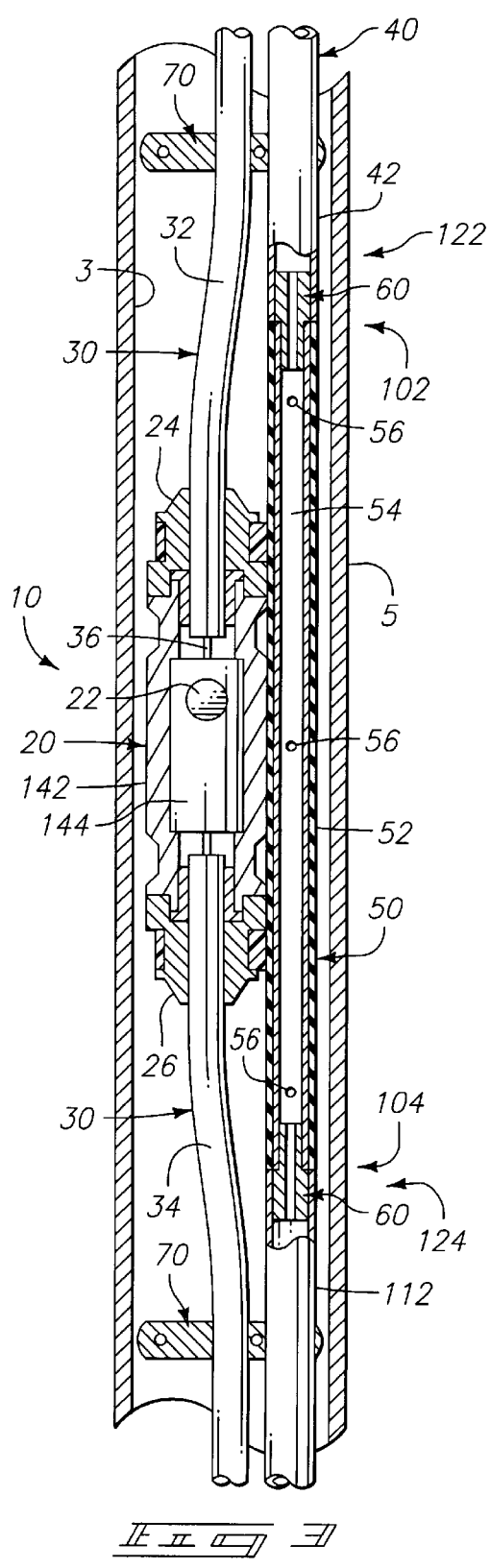

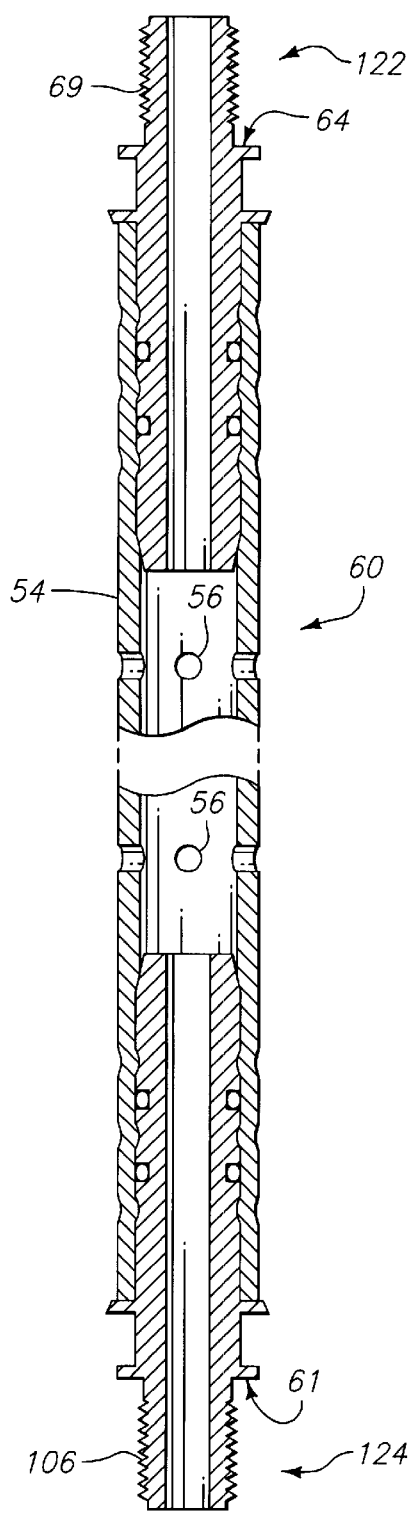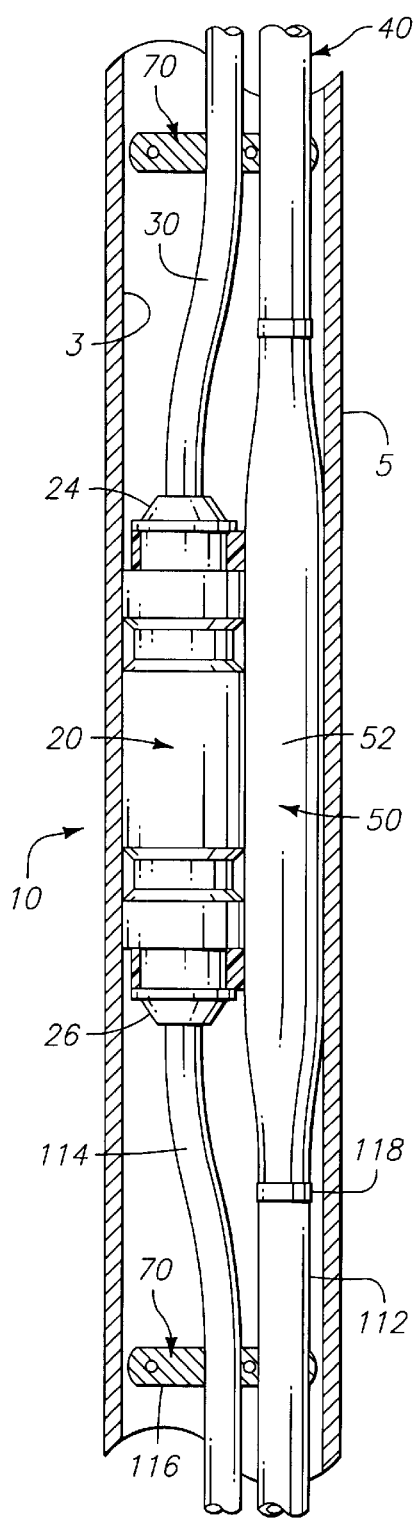

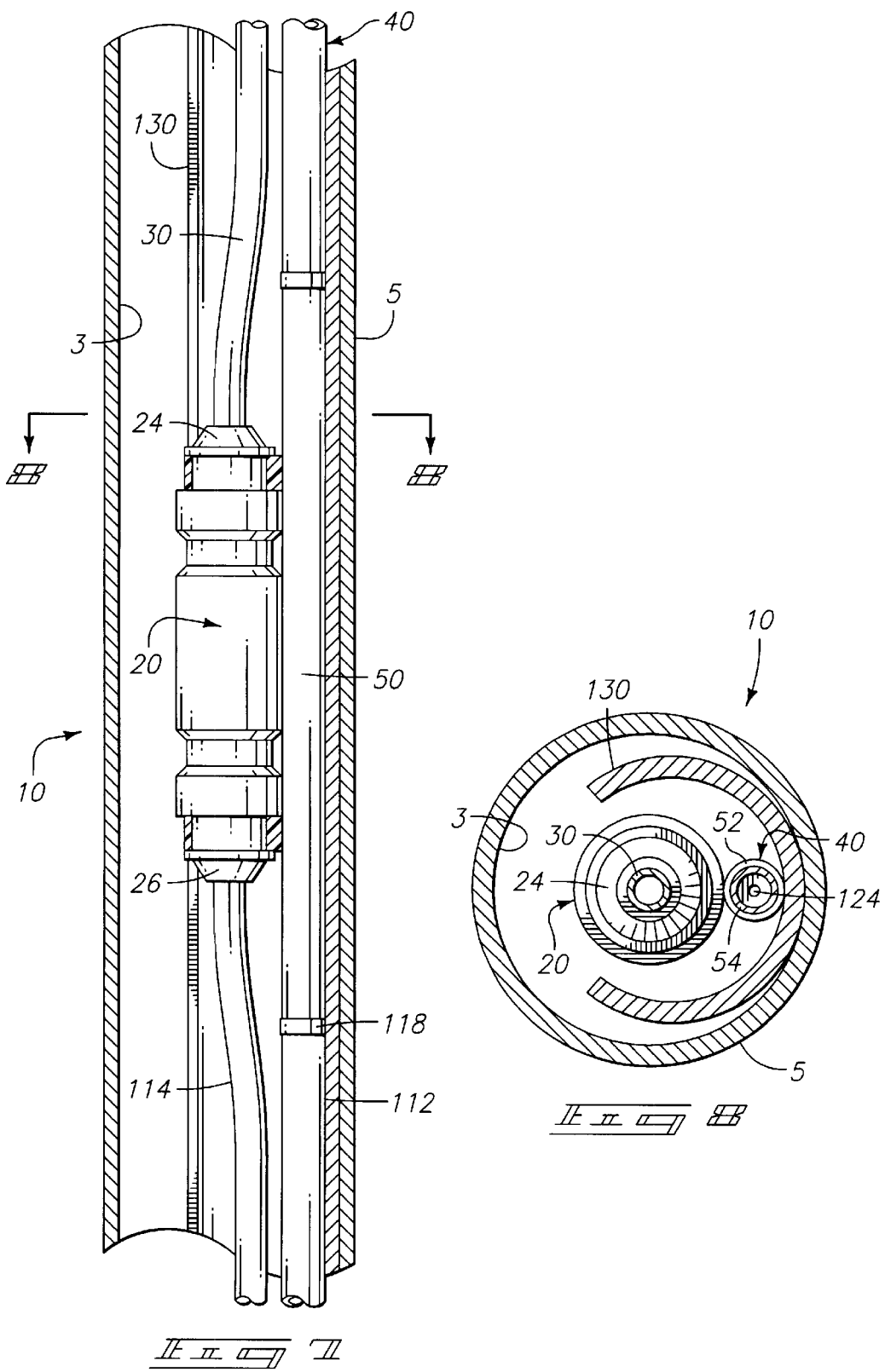

RECEIVER ARRAY USING TUBING CONVEYED PACKER ELEMENTS

REFERENCE TO RELATED APPLICATIONS

This application is a continuation-in-part of U.S. patent application Ser. No. 09/394,465, filed Sep. 11, 1999, now U.S. Pat. No. 6,206,133, issued Mar. 27, 2001, which is in turn a continuation-in-part of U.S. patent application Ser. No. 09/038,856, filed Mar. 11, 1998, now U.S. Pat. No. 5,962,819.

TECHNICAL FIELD

This invention relates to the field of geophysical seismic receivers, and more particularly to downhole and marine bottom geophysical receiver arrays.

BACKGROUND OF THE INVENTION

An emerging area in the field of seismology is the area of borehole seismology. In traditional seismology, both a source and sensors have been either located at the surface, or the receiver have been located downhole while the source has been located on the surface. In borehole seismology, the source is placed in a borehole while the receivers may be either on the surface, or preferably in a borehole as well. This later mode is known as "cross-well seismology." Borehole seismology is particularly useful in determining the condition of an existing reservoir, following the history of a producing reservoir, and exploring potential new reservoirs. Borehole seismology also makes it possible to routinely record shear waves which allows for mapping lithology of oil and gas reservoirs.

A limiting factor in borehole seismology has been the lack of receiver arrays for boreholes which provide the dense spatial sampling required to make use of the high seismic frequencies made possible by the consolidated geologic formation. Shear (S) waves, for example, have only half the wave length of compressional (P) waves, further increasing the need for dense spatial sampling. The recording of compressional waves as well as polarized shear waves makes it possible to map the mechanical properties of oil and gas reservoirs, as well as map and distinguish between different fluids and the effect of lithology. This information may also be used to map differential field stresses, which is the primary source for differential permeability in a reservoir. Further, high signal to noise ratios, as well as a dense spatial sampling, will allow for direct use of attenuation of compressional and shear waves for characterization of oil and gas reservoirs. This combination of seismic measurements will allow much more information to be extracted about the true nature of oil and gas reservoirs.

In order to record and collect this required volume of measurements from borehole seismology, what is needed is a seismic receiver array which may be deployed within a borehole and which has the capability of detecting both compressional and shear waves, as well as transmitting this information from the borehole to the surface where it may be further collected and/or processed. However, the borehole environment makes it difficult to record useful seismic data for borehole seismology. Merely lowering an array of hydrophones into a borehole is typically insufficient to record the data necessary for useful borehole seismology. Hydrophones are susceptible to recording energy from tube wave noise, which may obscure useful seismic signals. Further, in a gas filled well hydrophones are useless, as the gaseous fluid in the borehole do not conduct the energy from the borehole to the hydrophone.

Therefore, what is needed is a receiver which can be used for borehole seismology. More particularly, what is needed is a receiver array which can be deployed within a borehole and which will record shear and compressional waves useful in characterizing the reservoir, as well as transmit the received data to a surface location where it may be utilized.

BRIEF DESCRIPTION OF THE DRAWINGS

Preferred embodiments of the invention are described below with reference to the following accompanying drawings.

FIG. 1 is an environmental view showing one embodiment of a receiver array described herein deployed within a borehole in a reservoir.

FIG. 2 is a side elevation view showing one embodiment of a portion of a receiver array described herein deployed within a borehole.

FIG. 3 is a sectional view of the receiver array shown in FIG. 2.

FIG. 5 is a sectional detail of an expansible section connector which can be used in the receiver array described herein.

FIG. 6 is a side elevation view showing the receiver array of FIG. 2 in a activated position wherein the receiver is coupled to the borehole wall.

FIG. 7 is side elevation view of an alternate embodiment of the receiver array shown in FIG. 2.

FIG. 8 is a top sectional view of the receiver array shown in FIG. 7.

SUMMARY OF THE INVENTION

Figure 4:
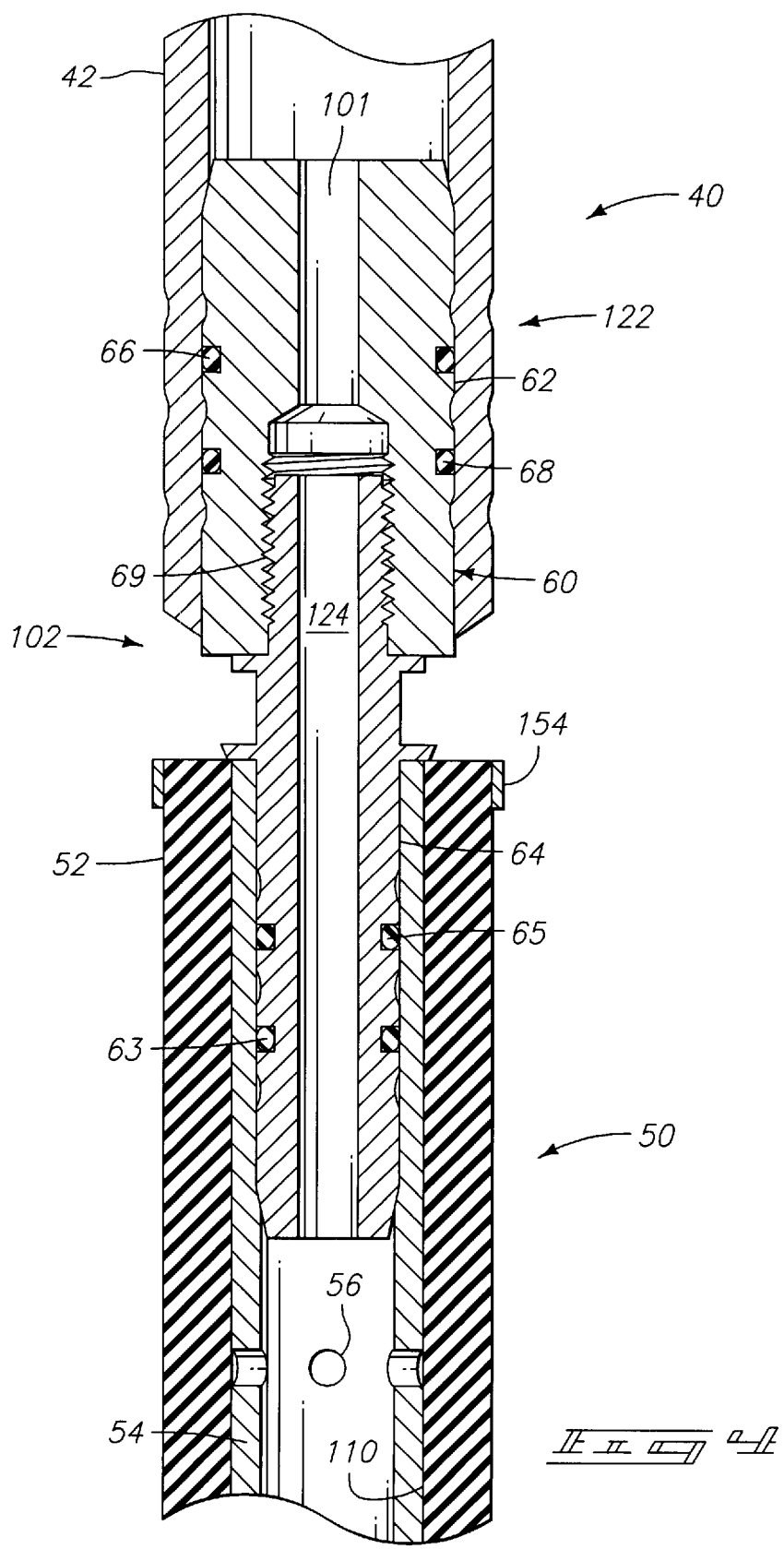
FIG. 4 is a side elevation detail of an expansible section connector which can be used in the receiver array described herein.

An apparatus for detecting geophysical energy is disclosed. The apparatus has a receiver configured to receive geophysical energy, the energy being characterized by certain characteristics associated with geophysical energy. The receiver converts the geophysical energy into a signal which is representative of at least one characteristic of the geophysical energy. The device further includes a signal transport device configured to accept the signal from the receiver and relay the signal to a remote location. The apparatus further includes a fluid conduit configured to contain a pressurized fluid. The fluid conduit has a receiver deployment section which is located proximate to the receiver. The receiver deployment section is responsive to an increase in pressure within the fluid conduit, causing the receiver deployment section to operate to press the receiver against the inside of a wellbore to achieve beneficial coupling between the receiver and the wellbore. The receiver deployment section can be configured in a number of different ways.

In one embodiment the receiver deployment section comprises an expansible segment in the fluid conduit which expands as pressure within the fluid conduit is increased. The expansible segment then presses against the receiver, pushing the receiver towards the wall of the wellbore. In another embodiment the receiver deployment section comprises a mechanical actuator which presses the receiver towards the wall of the wellbore.

In one example of a mechanical actuator the receiver deployment section comprises a spring disposed between the conduit and the receiver and configured to bias the receiver away from the conduit to the second position. A releasable latch temporarily secures the receiver in a first position proximate to the fluid conduit. A latch release device is configured to release the latch in response to pressure within the conduit to allow the receiver to move to a second position more distal from the fluid conduit than the first position. The latch can be pivotally mounted to a support member and can be configured to release the receiver when the latch is pivoted. The latch release device can comprise a piston movably disposed through an opening in the conduit. The piston has a first end configured to push the latch and cause it to pivot when the piston is moved in the opening in the conduit. The piston moves within the opening in the conduit as a result of a differential pressure between the interior and the exterior of the conduit.

In another example of a mechanical actuator the receiver deployment section comprises a first piston movably disposed through a first opening in the conduit. The first piston has a first piston first end configured to contact the receiver and to move the receiver from the first position to the second position when the first piston is moved in the first opening in the conduit. The first piston moves within the first opening in the conduit as a result of a differential pressure between the interior and the exterior of the conduit. The actuator can further include a second piston configured similarly to the first piston to provide additional deployment force on the receiver.

In yet another example of a mechanical actuator the receiver deployment section comprises a receiver housing attached to the fluid conduit and configured to receive at least part of the receiver when the receiver is in the first position. A first connector pad is connected to the receiver. The device further includes a first clamping arm defined by a first end and second end, the clamping arm first end being pivotally attached to the receiver housing. The clamping arm second end is pivotally attached to the first connector pad. A first piston is movably disposed through a first opening in the conduit. The first piston has a first end configured to contact the first clamping arm and to move the first clamping arm when the first piston is moved in the first opening in the conduit. The first piston moves within the first opening in the conduit as a result of a differential pressure between the interior and the exterior of the conduit. The device can further include a second clamping arm and a second piston configured similarly to the first clamping arm and the first piston to provide additional force on the receive when deploying the receiver from the apparatus.

Although in the following discussion I may refer to the expansible segment as being the apparatus which moves the receiver towards the wall of the wellbore, it is understood that the expansible segment can be substituted for any other the other receiver deployment sections disclosed herein.

The system described herein provides for 1) a small receiver pod; 2) low weight of the receiver pod; 3) high clamping force provided by the receiver deployment section; and 4) high clamp force to weight ratio.

DETAILED DESCRIPTION OF PREFERRED EMBODIMENTS OF THE INVENTION

An apparatus for detecting geophysical energy is described herein. The apparatus comprises a receiver, a signal transport device, and a fluid conduit having a receiver deployment section located proximate to the receiver. An increase of fluid pressure within the fluid conduit causes the receiver deployment section to actuate, pressing the receiver to a surface, such as the wall of a wellbore or an ocean bottom surface, allowing improved signal reception by the receiver.

Preferably, the apparatus comprises a plurality of receivers and a common fluid conduit, the common fluid conduit having a plurality of receiver deployment sections located proximate to each receiver, such that an increase of pressure within the fluid conduit will cause essentially simultaneous actuation of all of the receiver deployment sections. Thus, when the receiver array is for example located within a borehole, the receiver deployment sections may all be actuated at an essentially common instant to cause the receivers to be clamped within the wellbore at essentially the same time. The fluid conduit 40 can be fabricated from tubing such as production tubing. The fluid conduit can also comprise coiled tubing, which can be deployed from a spool as shown in FIG. 1. The receiver deployment sections can be considered as packer elements when the array is disposed in a wellbore. Thusly, the apparatus can be described as a clamped receiver array using production tubing conveyed packer elements.

In the receiver array embodiment, a large number of receivers can be coupled together over a long distance, for example 1,000 meters (m) or more. Thus, when the receiver array is deployed within a borehole, a support mechanism is preferably provided to support the weight of the receiver array while it is in an unclamped position. One embodiment of the invention described herein incorporates tensile strength members to eliminate the need for a separate support mechanism to support the weight of the apparatus within a wellbore. When the receiver array is deployed within a wellbore and the receiver deployment section comprises an expansible section, local receivers, and the outer surface of an expansible section proximate to the receiver, will normally be exposed to localized pressures within the wellbore. One method of causing the expansible section to expand and move the receiver into contact with the wellbore wall is to increase the pressure within the fluid conduit to a pressure greater than that within the wellbore at that point. Thus, a differential pressure is generated to actuate the apparatus to cause coupling of the receiver within the wellbore. A similar result is achieved for other types of receiver deployment sections disclosed herein. In one embodiment, the apparatus includes a flow or pressure fused valve located at the end of the fluid conduit which is disposed within the wellbore to allow fast acting response of the receiver deployment sections in response to a pressure increase within the fluid conduit over the local pressure within the wellbore.

FIG. 1 shows an exemplary clamped receiver array 100 in an environmental view wherein the receiver array is deployed within a wellbore 5 in an earth formation 2. In the embodiment shown in FIG. 1, the apparatus 100 may properly be described as a downhole clamped receiver array. The receiver array 100 has a plurality of receiver sections 10 having receivers 20 connected by a common signal cable 30. Essentially parallel to the signal cable 30 is the fluid conduit 40. The fluid conduit 40 has expansible sections 50 located adjacent to receivers 20. The expansible sections act as the receiver deployment sections in this embodiment. In this embodiment fluid conduit 40 comprises coil tubing such that the apparatus can be wound onto a spool 8 which can be supported by a vehicle 6, allowing easy transportation and deployment of the apparatus within a wellbore. Although in the preferred embodiment a plurality of receivers and expandable sections are employed in the apparatus, it is understood that the apparatus can be constructed and deployed using only a single receiver and a single expansible section. For exemplary purposes only, a signal cable 30 can be provided with between 20 and 2000 receivers spaced between about 0.3 m and 60 m apart.

Turning now to FIG. 2, a detail of the apparatus 10 having a single receiver 20, associated fluid conduit 40, and expansible section 50 is shown deployed within a wellbore having a casing 5. The apparatus preferably further includes positioning devices 70 which are useful in positioning and protecting the receiver 20 and the fluid conduit 40 within the casing 5. Centralizing the receiver 20 and the fluid conduit 40 within the casing 5 is beneficial to reduce unwanted contact between these components while the apparatus 10 is being inserted into the casing. Such unwanted contact can cause damage to the apparatus, and is therefore undesirable. The positioning device 70 can also be utilized to connect the signal cable 30 to the fluid conduit 40 to reduce relative movement there between. In one embodiment of the invention wherein only a single receiver is employed, the signal cable section 114 and the fluid conduit section 112 are terminated shortly below positioning device 116. In a first variation on the single receiver embodiment, the signal cable section 114 and the fluid conduit section 112 are absent or terminated just below the receiver second end 26 and the expansible section second end 118, respectively.

In yet an alternate embodiment of the apparatus, several receivers 20 can be connected to the signal cable 30 between expansible sections 50. That is, receiver arrays wherein certain receivers are not provided with dedicated expansible sections can be employed.

Turning now to FIG. 3, a cross-sectional view of the apparatus 10 of FIG. 2 is shown. The major components of the apparatus 10 shown in FIG. 3 are the receiver 20, the signal cable 30, the fluid conduit 40, and the expansible section 50. The expansible section 50 is connected to fluid conduit sections 42 and 112 by expansible section connector 60. The apparatus 100 of FIG. 1 can further include an orienting device 170, which can comprise a gyroscopic orienting apparatus. Orienting device 154 is useful for determining the compass direction of the apparatus 100 in the borehole 5. Each component will now be described in further detail.

The Receiver

The receiver 20 is a receiver configured to receive geophysical energy and record certain characteristics associated with the geophysical energy. The geophysical energy can be characterized by such characteristics as frequency, amplitude, polarization, and the direction of propagation of the energy wave associated with the geophysical energy. Preferably, the receiver has sensors 22 which can comprise 3-component or 3-dimensional geophones. Such geophones record geophysical seismic energy moving in a vertical direction, as well as in a first and a second horizontal direction. One example of sensors used in a receiver in the present invention are 30 Hz, 3-component geophones having a frequency range of 10 Hz to 1,000 Hz and being digitized with a sample rate of between and including 2 ms and ¼ ms. In addition to the 3-component sensor described, 1, 2, or 4-component sensors can also be employed.

In one example, the receiver 20 includes a polyurethane pod or casing 142 having a diameter of 7 cm and a length of approximately 30 to 36 cm. The geophones 22 are preferably epoxied within the casing 142. The geophones 22 are preferably further potted in a semi-rigid rubber/plastic compound to absorb thermal and pressure strain on the geophone holder 144. Holder 144 is preferably fabricated from aluminum. The geophone holder 144 is preferably potted with R828 Epon epoxy, available from Shell Chemical Company.

Figure 10:
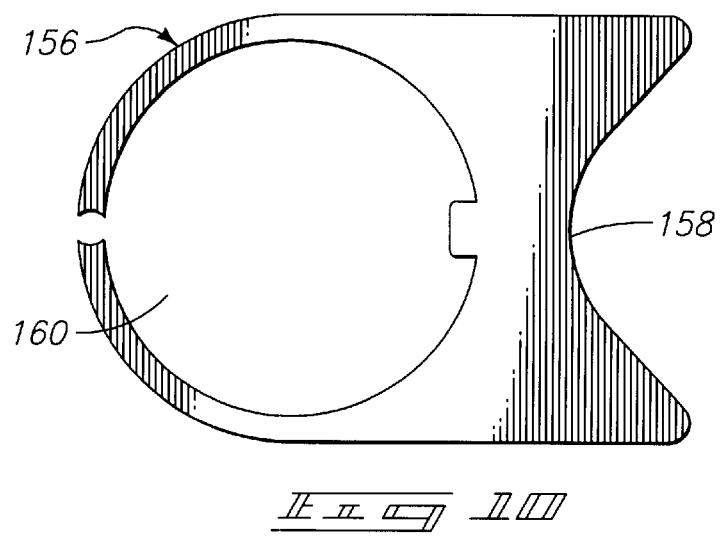
FIG. 10 is a plan view of a positioning ring used to maintain the position of the receiver relative to the expansive element.

The receiver 20 is held in relative position to the expansible section 50 by positioning device 70, as described below. The receiver 20 of FIG. 3 preferably further includes locator rings 156 which are configured to prevent the receiver 20 from moving laterally with respect to the fluid conduit 40. Locator ring 156, shown in detail in FIG. 10, includes an opening 160 to receive receiver 20, and a concave portion 158 to receive the expansible section 50.

Signal Cable

In response to geophysical energy received by sensor 22, the receiver 20 produces a signal which can then be communicated to a remote location, such as to a surface location where the signal can be recorded or further processed. A device for communicating the signal can include the signal cable 30 of FIG. 3. Other signal transmitting devices can be employed, such as radio transmission. The signals can be transmitted to recorder 172 of FIG. 1.

Signal cable 30 further includes a signal conductor 36. Examples of signal conductors 36 are metal wires or optical fibers. For example, in a receiver array having 80 3-component receivers resulting in 240 channels for data transmission, a 256 twisted pair cable was used for the signal conductors. The twisted pairs were of #28 wire with thin braided shield around the bundle. The wires were coated with a dual copolymer/polypropolene insulation rated at 176° C. (350° F.). The cable was jacketed with double extruded polyurethane jacket, each layer having a thickness of 2.3 mm. The signal cable in the example further included a central Kevlar strength member having a 1600 kg break strength.

Signal cable 30 can be an analog cable with each sensor 22 hard-wired directly to the remote location (as for example the surface). Alternately, the sensors 22 can be locally digitized and the digital data or signal can be multiplexed and sent to the remote location on multiplexed signal conductors 36. The benefit of using multiplexed signal conductors is that a lesser number of signal conductors is required. For example, in the example described herein wherein 240 sensors were employed, 256 twisted pairs were used. However, when the sensors are provided with digitizers to digitize the signal, and 4 signal channels are used, then a 64 twisted pair signal conductor arrangement can be employed. Multiplexing can be performed with optical fiber conductors as well.

Fluid Conduit

The fluid conduit 40 of FIG. 3 is used to communicate a fluid to the receiver deployment section, shown here as expansible section 50. The fluid can be used to actuate the receiver deployment section. For example, the fluid in the conduit 40 can expand the expansible section 50 causing the receiver 20 to be pressed up against the inner wall 3 of the borehole casing 5. This is shown graphically in FIG. 6 where receiver 20 has been pushed up against the inner side wall 3 due to expansion of the resilient sleeve 52 which comprises a part of expansible section 50 and fluid conduit 40. Other embodiments of receiver deployment sections, and their techniques for being actuated by fluid within the fluid conduit 40, will be discussed further below.

In one embodiment, the fluid conduit 40 comprises a continuous piece of coil tubing having resilient expansible sleeves such as rubber bladders placed over the outside of the tubing at expansible section locations 50. In those positions where the rubber bladder is placed over the coil tubing, the tubing is provided with holes to allow fluid within the fluid conduit to be forced outside of the fluid conduit, thus causing the rubber bladder 52 to expand and push the receiver 20 into the casing 5. In this embodiment, the rubber bladder 52 is secured to the coiled tubing by metal straps 154 of FIG. 4. Fluid conduit 40 can be a length of standard tubing or a length of coiled tubing. An embodiment wherein production tubing is used is discussed further below.

Coil tubing has the benefit of being capable of deployment into the well from an industry standard coiled tubing rig, as indicated in FIG. 1. Such rigs allow the tubing to be wrapped on a spool rather than pieced together by individual straight pipe lengths. This allows a simpler deployment of the apparatus in the field. Preferably, the coiled tubing is between about 2.3 cm and 7.9 cm (0.9 in. and 3.1 in.) in diameter. The only practical limit on the length of coiled tubing which can be employed is the weight which must be supported by the coiled tubing when it is deployed within a borehole. Coiled tubing lengths of 9000 m and greater can be employed in the apparatus disclosed herein.

In a first embodiment of the fluid conduit 40 described above, the receiver deployment section comprises a resilient sleeve 52 disposed about the outside diameter of a continuous piece of coiled tubing as shown in FIG. 3. In this embodiment, non-continuous segments of coiled tubing are used between expansible sections 50. Expansible sections are preferably provided with a resilient sleeve 52 having an uninflated outside diameter approximately equal to the outside diameter of the coil tube 42. In this way, a constant diameter for the fluid conduit 40 can be maintained, allowing ease of spooling of the fluid conduit, it being appreciated that when a resilient sleeve 52 having an outside diameter greater than the outside diameter of the coiled tube 42 is used, the fluid conduit will not be spooled in a smooth continuous manner.

Most preferably, the fluid conduit 40 further comprises an expansible section connector 60 which advantageously includes an expansible section tensile member 54 as shown in FIG. 4.

Positioning Device

Figure 9:
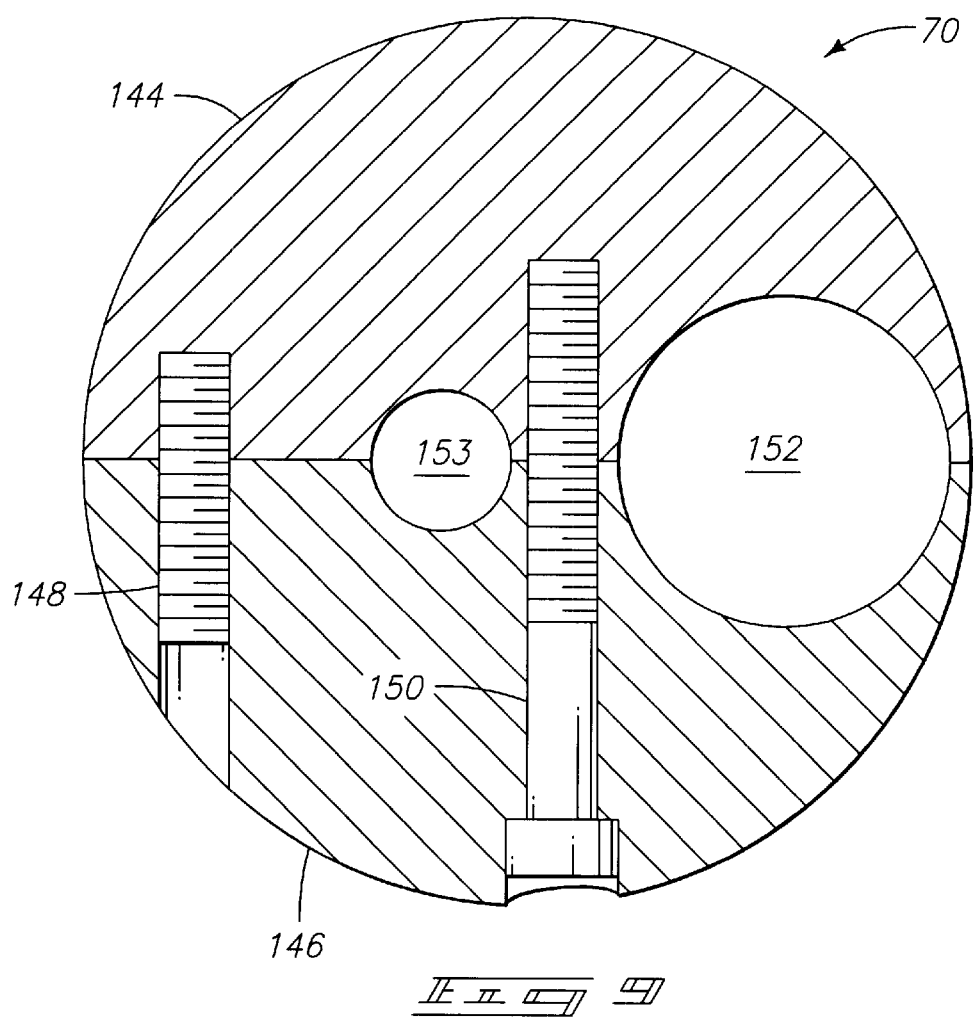
FIG. 9 is a sectional view of a positioning device which may be used in a receiver array as described herein.

A positioning device 70 shown in FIG. 3 which can be used in the embodiment described herein is shown in further detail in FIG. 9. FIG. 9 shows a plan view of the positioning device 70 of FIG. 3. The positioning device 70 comprises a first half 144 and a second half 146 which are coupled together by fasteners 148 and 150, which can comprise threaded couplers. When coupled together, the first half 144 and the second half 146 define a first opening 152 which can receive fluid conduit 40 of FIG. 6, and a second opening 153 which can receive the signal cable 30. In this manner, the fluid conduit 40 can be held in relative position to signal cable 30 and hence receiver 20. This allows the receiver 20 to be accurately positioned with respect to the receiver deployment section, here, expansible section 50.

In addition to positioning the receiver in the wellbore, the positioning device is also useful in dampening noise in the wellbore ("tube waves"), which are conducted by casing 5 of FIG. 1.

Expansible Section

As described above, in one embodiment the receiver deployment section comprises an expansible section. Turning to FIG. 4, a detail of the upper end 122 of the expansible section 50 of the fluid conduit 40 shown in FIG. 3 is provided in detail. The expansible section 50 includes an expandable sleeve 52 which is preferably a resilient sleeve. The sleeve can be fabricated from any material having a tendency to expand when subjected to a differential pressure and preferably returned to its original size and shape once the applied pressure has been removed. The resilient sleeve 52 can also be described as a rubber bladder. A preferable material of construction is a nitrile elastomer. More preferably, the resilient sleeve 52 is fabricated from nitrile having a hardness of duro 60. An alternate material of construction for the resilient sleeve 52 is vinylidene flouride hexafluorpropylene tetrafluorethylene, available from E.I. du Pont de Nemours and Company as "Viton", having a hardness of duro 60.

The resilient sleeve 52 is coupled to the main tubing section 42 of the fluid conduit 40 by the expansible section connector 60. The expansible section connector 60 includes tubing end fitting 62 and expansible section connector end fitting 64. Expansible section connector 60 further preferably and advantageously includes expansible section tensile member 54. Tubing end fitting 62 securely engages the primary tubing 42. One method for such secure engagement is to swage the end of tubing 42 over the tubing end fitting 62. Another method to secure the tube 42 to the end fitting 62 is by welding. O-rings 66 and 68 are preferably provided to provide a fluid-tight seal between the coiled tubing 42 and the tubing end fitting 62.

The expansible section tensile member 54 is securedly held in place against the expansible section end fitting 64 by an appropriate method as a swage fitting. O-rings 63 and 65 are employed to provide a fluid-tight seal between expandable section tensile member 54 and expandable section connector end fitting 64.

Tubing end fitting 62 is securedly engaged by expansible section connector end fitting 64 by a method such as threads 69. Expandable sleeve 52 is preferably disposed about the outer diameter of expandable section tensile member 54 and the exposed portion of expandable section connector end fitting 64. The expandable sleeve 52 is securedly held in such position by a metal strap 154, which can be fabricated from stainless steel. In this manner, the fluid conduit 40 provides a continuous strength member to support the apparatus when it is deployed for example within a wellbore. As seen in FIG. 4, this also provides a constant outside diameter for the fluid conduit 40.

In operation, fluid within fluid conduit 40 passes into the expansible section connector 60 by way of fluid passage 101 which is disposed in the coiled tubing end fitting 62. Expandable section connector end fitting 64 is likewise provided with a fluid passage 124 allowing fluid to pass into the expandable section tensile member 54. The expandable section tensile member 54 can be a piece or regular production tubing or a coiled tubing section. In one example, tubing section 42 is a 3.8 cm (1.5 in. nominal) diameter coiled tubing, and section tensile member 54 is a 2.5 cm (1 in. nominal) expendable diameter coiled tubing section.

Preferably, the hollow tubing used for expandable section tensile member 54 is provided with holes 56 allowing fluid to pass from within the fluid conduit into the space 110 between the outside diameter of the expandable section tensile member 54 and the resilient sleeve 52. When the fluid pressure within the fluid conduit is increased beyond the pressure at the outside diameter of the expandable sleeve 52, the expandable sleeve is caused to expand in an outward manner, thus pushing against the receiver 20 of FIG. 3 and causing the receiver 20 to move against the inner wall 3 of the casing 5.

Turning to FIG. 5, a side elevation view of the expandable section connector 60 of FIG. 4 is shown. Upper end 122 and lower end 124 are shown with respect to similar upper and lower ends of FIG. 3. The expandable section connector 60 has a first expandable section connector end fitting 64 and a second expandable section connector end fitting 61. Swaged about, or welded to, each of the expandable section connector end fittings is expandable section tensile member 54, which here comprises a 2.5 cm diameter (1 in. nominal) hollow coiled tubing section 54. Advantageously, the threads 69 in the first expandable section connector end fitting 64 are provided in a first direction, while the threads 106 in the second expandable section connector end fitting 61 are provided in a second direction. For example, thread 69 can be right hand threads while threads 106 are left hand threads. In this example, the expandable section connector 60 can be rotated in a single direction to engage tubing end fittings at each end of the expandable section connector 60. When the expandable section connector 60 is rotated in the opposite direction, the tubing end fittings at each end of the expandable section connector 60 will be disengaged from the connector. This has the beneficial effect of allowing expandable sections 50 to be removed from the fluid conduit 40 without the need to rotate one end or the other of the fluid conduit 40 with respect to the expandable section 50. This beneficial feature can be utilized for example to replace expandable sleeves 52 which may become damaged or worn in use.

Outer Sleeve

In yet an alternate embodiment, the signal cable 30, receivers 20, and the fluid conduit 40, can be received within a secondary tubing 130. This is shown in side elevation view in FIG. 7 and in a plan sectional view in FIG. 8. When the receiver deployment sections are actuated, (for example, when expansible sections 50 within the fluid conduit 40 expand), the receivers 20 will be pushed out of the secondary tubing 130 into contact with the inner wall 3 of the casing 5. In this embodiment, the secondary tubing 130 essentially acts as a protective outer sleeve in which the apparatus 10 is protectively contained until such time as the apparatus is to be activated within the borehole. Once the pressure within the expansible section 50 is reduced, the receivers 20 and signal cable 30, retract back into the secondary coiled tubing 130.

Figure 11:
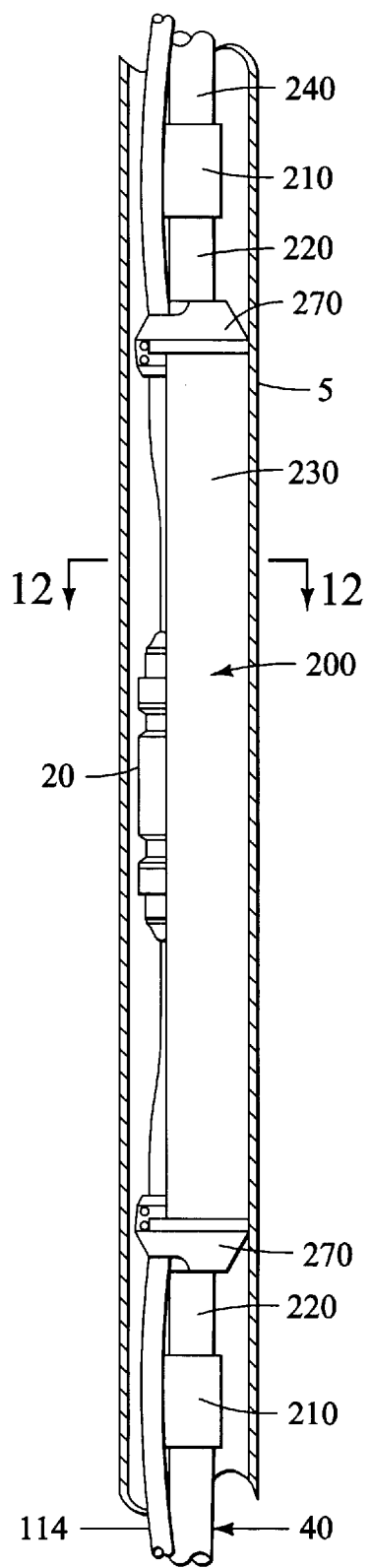
FIG. 11 is side elevation view of an alternate embodiment of the receiver array shown in FIG. 7.
Figure 12:
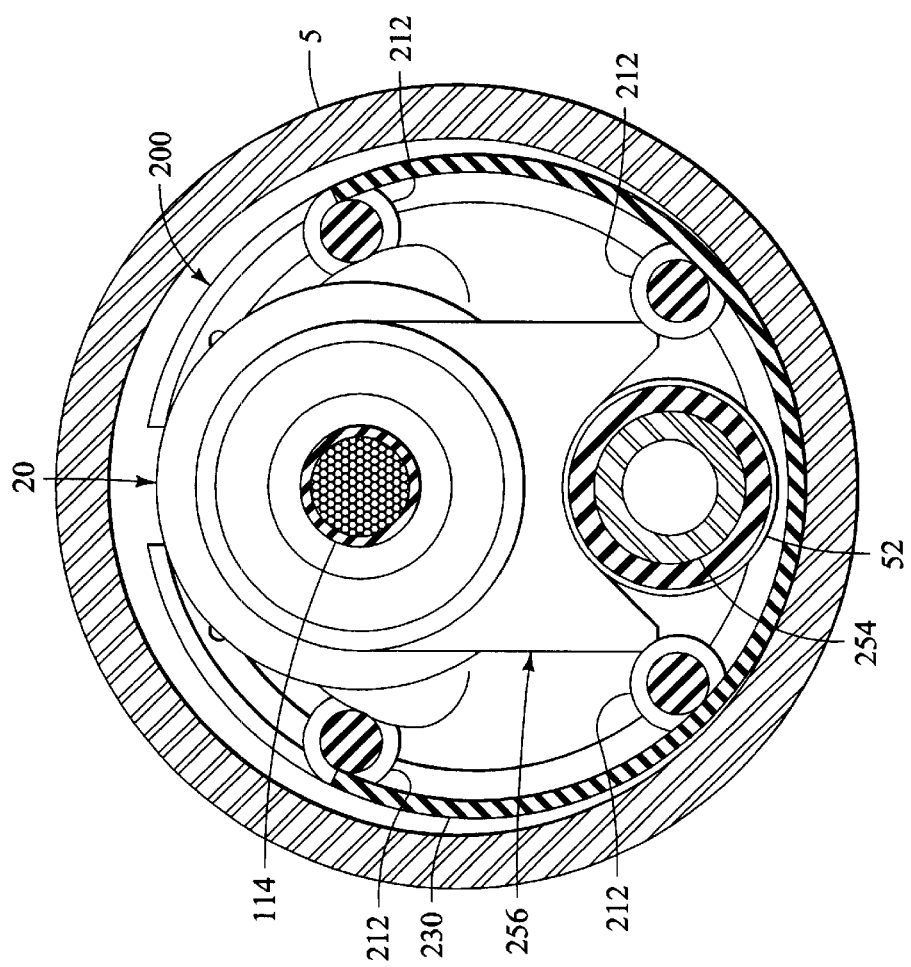
FIG. 12 is a top sectional view of the receiver array shown in FIG.
Figure 13:
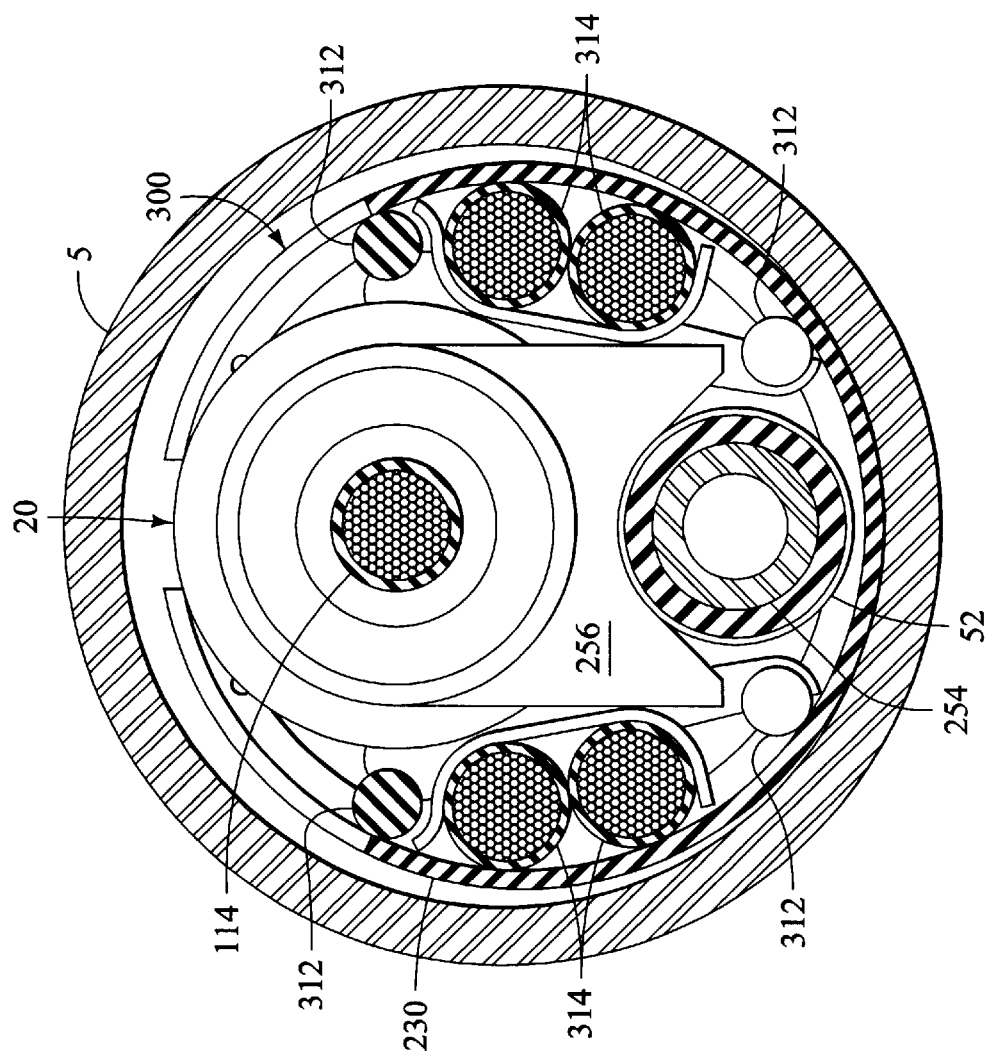
FIG. 13 is a top sectional view of an alternate embodiment of the receiver array shown in FIG. 12.

Another embodiment of an apparatus in accordance with the present invention is shown in FIGS. 11–13. FIG. 11 depicts a receiver array 200 which is similar to the receiver array 10 depicted in FIGS. 7 and 8. The main similarity between the array shown in FIG. 8 and that shown in FIG. 12 is the housing 130 and 230 (respectively) which surrounds the geophone pod 20. The primary difference between the array shown in FIGS. 7 and 8 and that shown in FIGS. 11 and 12 is the array in FIG. 7 uses an off-center coiled tubing section 112 to conduct the fluid in the fluid conduit 40, while the array in FIG. 11 uses production tubing sections 240 which are centered within the wellbore to conduct the fluid in the fluid conduit 40.

In the receiver array 200 shown in FIG. 11, the production tubing sections 240 can be coupled to the expansible section (not shown in FIG. 11) using standard tubing collars 210. These standard tube collars have reverse threaded ends, allowing the coupling to be turned to disconnect the production tubing section 240, without necessitating turning the tube section 240 or the geophone pod housing 230, as was described above.

The tube collars 210 are connected to pod housing conduit extensions 220, which are in turn welded to the pod housing end caps 270. The signal cable 114 is secured to the pod housing end caps 270 to relieve tension in the cable and impart the force to the end caps 270, and consequently to the production tubing 240. Fluid passing through pod housing conduit extensions 220 is routed to the inner fluid conduit 254 (shown in FIG. 12). Since the pod housing conduit extension 220 is essentially centered with respect to the wellbore, whereas the inner fluid conduit is located proximate to one side of the wellbore, the two are connected by a piece of fluid conduit (not shown) having an offset or a slight bend.

Turning now to FIG. 12, the receiver array 200 comprises an expansible section within the fluid conduit 40 of FIG. 11. The expansible section comprises an inner conduit 254 and an expansible sleeve 52. The portion of the inner fluid conduit 254 which is covered by the expansible sleeve 52 is perforated, allowing fluid to expand the expansible sleeve 52 in the manner described above. However, unlike the embodiment described above, in the preferred embodiment the inner conduit 254 does not function as a primary tensile strength member. Rather, the receiver array 200 employs tensile members 212 which are connected to the upper and lower end caps 270, thus communicating the weight of the geophone pods 20 and the signal cable 114 to the production tubing sections 240. One method of connecting the tensile members 212 to the end caps 270 is by welding.

In one embodiment the outside diameter of the geophone pod housing 230 is sized to be approximately 0.5 inches (12 mm) less than the inside diameter of the wellbore casing 5. This has the effect of reducing pressure waves which can occur in the wellbore during use of the receiver array. Such pressure waves, or "tube waves", are recognized as a primary source of signal noise during down-hole seismic surveys, and therefore reducing the magnitude of such tube waves has a beneficial effect on the results of a survey taken using the downhole receiver array 200.

In operation, as fluid is pumped through the fluid conduit at a pressure higher than the pressure in the wellbore, the expansible sleeve 52 expands, pushing against the inner wall of the pod housing 230 and the pod shoe 256. The pod shoe 256 pushes the geophone pod against the inner wall of the well casing 5 to couple the geophone pod to the well casing. After the desired data has been recorded, the fluid pressure within the fluid conduit is relieved, allowing the expansible sleeve to contract and the geophone pod to retract back into the pod housing 230.

FIG. 13 shows an alternate embodiment of the receiver array shown in FIG. 12. The receiver array 300 of FIG. 13 comprises four additional signal cables 314 in addition to the receiver cable 114, providing five signal cables in all. These signal cables can be connected in signal communication with geophone pods which are intended to be positioned deeper within the wellbore than is the receiver 20 shown in FIG. 13. For example, in a receiver array having 100 geophone pods, the first cable can be connect to the first twenty geophone pods, the second cable to the second twenty geophone pods, and so on to the fifth cable. This allows data to be transmitted at a faster rate than using a single cable, and allows for improved signal quality over multiplexing data on a single cable.

Figure 14:
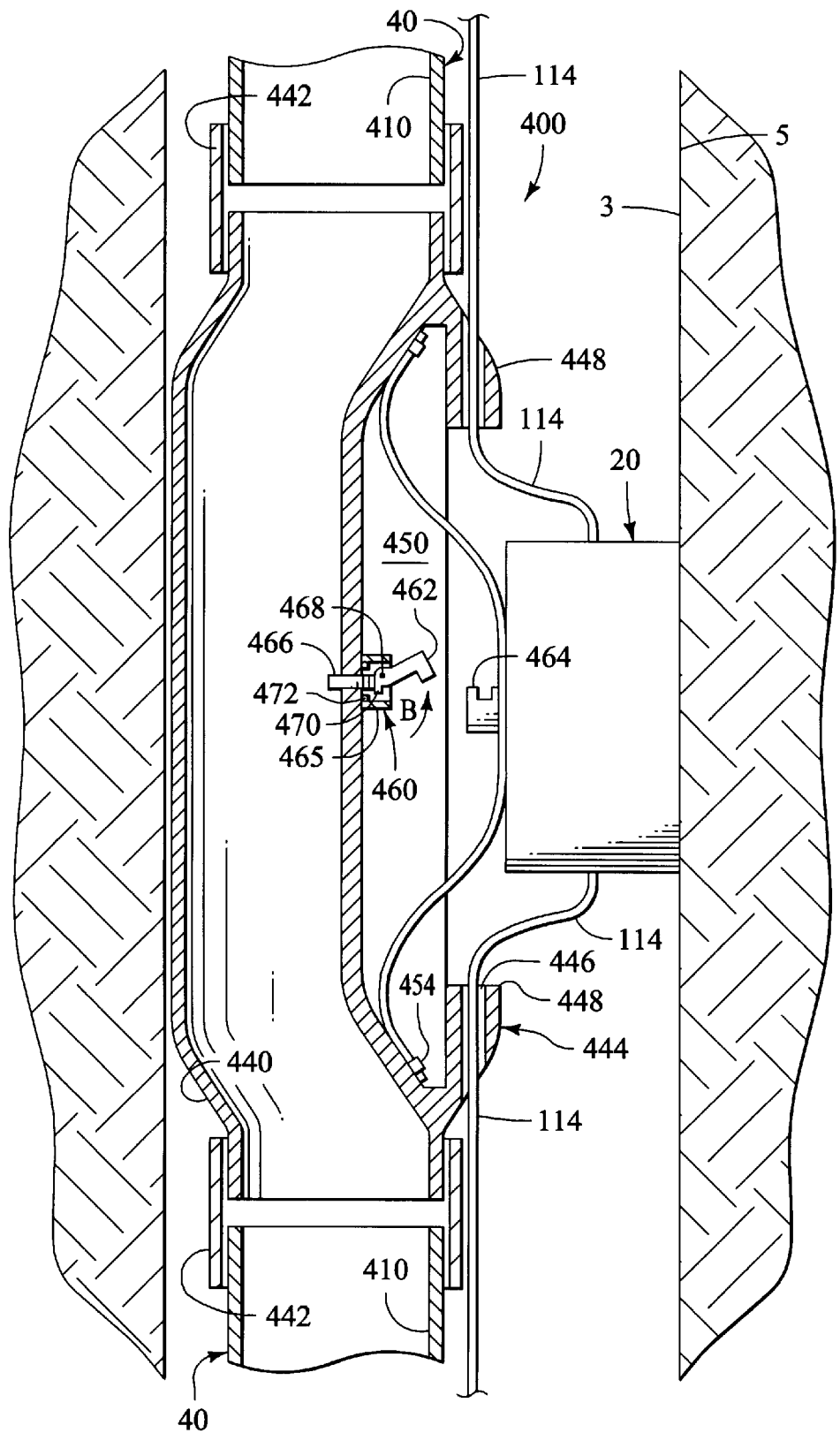
FIG. 14 is a side elevation sectional view of an alternate embodiment of the receiver array shown in FIG. 7.
Figure 15:
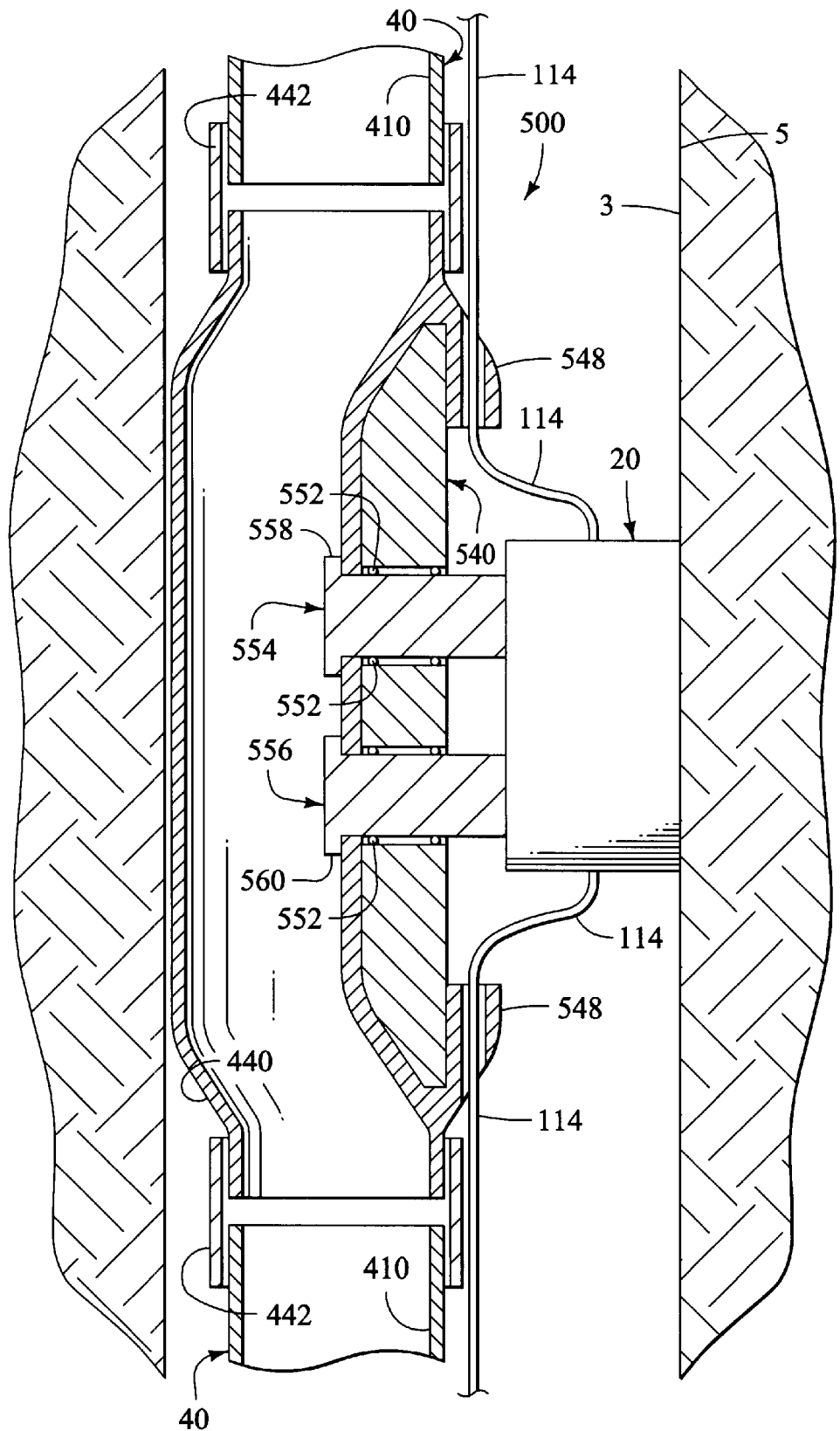
FIG. 15 is a side elevation sectional view of an alternate embodiment of the receiver array shown in FIG. 7.
Figure 16:
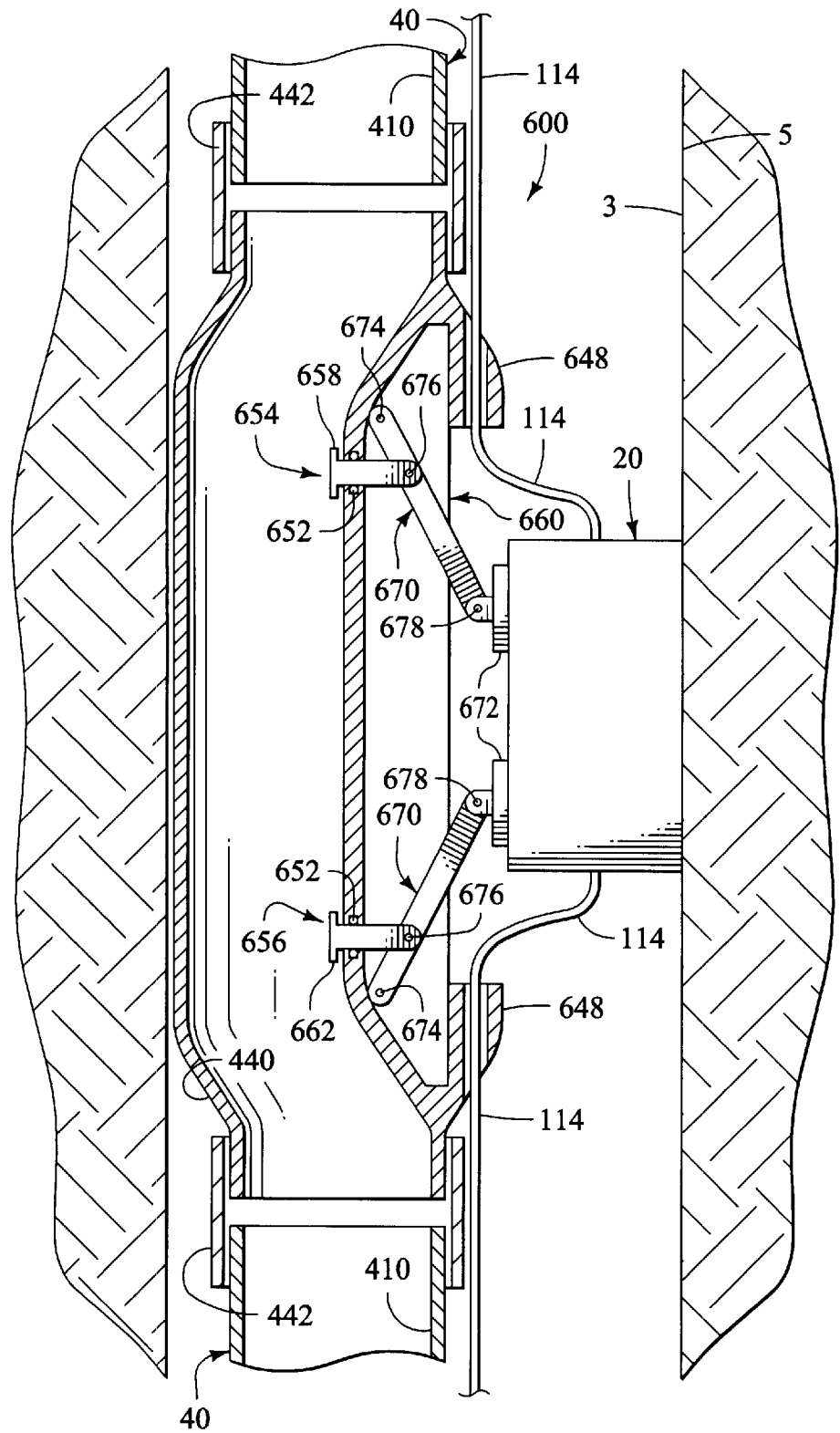
FIG. 16 is a side elevation sectional view of an alternate embodiment of the receiver array shown in FIG. 7.

FIGS. 14 through 16 depict alternate apparatus for the receiver deployment section which deploys the geophone pods from a retracted position to a position which brings them into contact with the borehole wall. The embodiments of the receiver deployment section can replace the expansible section embodiment described above. Each of the apparatus depicted in FIGS. 14–16 are actuated by pressure within the tubing which is used to support the geophone pods within the wellbore. I will now discuss each of these three apparatus in detail.

Turning now to FIG. 14, a side sectional view of a segment of a single receiver deployment section 400 in accordance with the present invention is depicted in a side elevation sectional view. The receiver deployment section 400 is part of a receiver array which includes a fluid conduit 40, which is configured in the manner described above with respect to FIG. 7. In this configuration, the fluid tubing acts to support the weight of the array. The fluid conduit 40 includes relatively straight sections of tubing 410, which can be coiled tubing or tubing sections, as well as an offset tubing section 440 which is disposed between two of the straight tubing sections 410. The offset tubing section 440 can be connected to the straight tubing sections 410 by threaded joints 442 or the like. The offset tubing section is provided with offset bends at each end such that the centerline of the offset section 440 is offset from the centerlines of the straight tubing sections 410. This allows one side of the offset tubing section 440 to be located proximate the wall 3 of a wellbore 5 in which the receiver array 400 can be deployed. The other side of the offset tubing section 440, that is, the side which is opposite of the side near the wall 3 of the wellbore, provides a space within the wellbore to receive a geophone pod 20.

Attached to the offset tubing section 440 is a geophone pod housing member 444. As depicted, the geophone pod 20 is in a deployed position in which the pod is in contact with the wall 3 of the wellbore 5. In a non-deployed position the geophone pod 20 is retracted to the left, towards the offset tubing section 440. In the retracted position the geophone pod housing 444 provides mechanical protection for the geophone pod 20.

The geophone pod is connected to a signal cable 114, in a manner similar to that described above with respect to FIG. 7. The signal cable is further supported by the geophone pod housing 444 by cable supports 448 which allow the cable to move with respect to the housing 444. Sufficient slack is provided in the signal cable 114 to allow the geophone pod, to which the cable is attached, to move freely from the non-deployed position (not shown) to the deployed position (shown).

In the embodiment depicted in FIG. 14 the receiver deployment section comprises a spring 452, which is shown here as a single-element leaf spring. The spring is connected to the geophone pod 20, and is disposed between the geophone pod 20 and the offset tube section 440 of the conduit. The spring is configured to bias the receiver or geophone pod 20 away from a first position proximate the offset tube section 440 and towards a second position proximate the inner wall 3 of the borehole 5, as depicted in the drawing. Spring end anchors 454 hold the ends of the spring 452 against the offset tube section 440, but are configured to allow the ends of the spring to slide freely through the anchors. This allows the spring 452 to be compressed (i.e., the geophone pod 20 to be held away from the wall 3 of the borehole 5) without causing buckling of the spring element.

When the geophone pod 20 is in the first or non-deployed position (not shown) and the spring 452 is compressed, the pod 20 is held in the retracted position by the spring release mechanism 460 and pod catch 464. The spring release mechanism comprises a mounting frame 465 which is attached to the offset tubing section 440. The spring release mechanism further includes a releasable latch 462 which is pivotally mounted to the mounting frame 465 at pivot mounting 468. The spring release mechanism 460 (or "latch release device") is actuated by a piston 466 which is disposed within an opening in the offset tubing section 440. A first end of the piston 466 is in contact with a release lever 470, which is part of the latch 462. A second end of the piston 466 is disposed within the interior of the offset tubing section 440. The spring release mechanism can also include a seal 472 to prevent fluids from escaping around the piston 466.

When the geophone pod 20 is in the non-deployed position the latch 462 is rotated slightly clockwise such that it engages the pod catch 464 and holds the geophone pod 20 in the first or retracted position against the force of the spring 452. When the geophone pod is to be deployed the pressure of the fluid in the fluid conduit 40 is increased to the point where the differential pressure between the interior and exterior of the fluid conduit provides a sufficient force on the piston 466 to cause the piston to be pushed against the release lever 470. The release lever then causes the catch 462 to rotate in the direction indicated by arrow "B", thus disengaging the catch 462 from the pod catch 464. The biasing force of the spring 452 is then free to push the geophone pod 20 away from the offset tube section 440 and into a second position in contact with the wall 3 of the borehole 5.

Although a specific implementation of the spring 452 and spring release mechanism 460 are depicted in FIG. 14 it is understood that any type of spring and release mechanism which accomplish the same function of using pressure in the tubing 40 to deploy the geophone pod 20 can be employed. For example, the geophone pod can be held in a retracted position against the biasing force of the spring by a catch with is configured to be electrically released, such as by a solenoid. The solenoid can be actuated by a pressure switch which is located within the offset tubing section 440 and is connected electrically to the solenoid. Electric power for the solenoid and the pressure switch can be provided for by the conduit 114. The pressure switch generates an actuation signal at a predetermined pressure within the fluid conduit, and transmits the signal to the spring release device, which then releases the spring, allowing the receiver to move away from the offset tubing section. This configuration eliminates any fluid sealing problems which may be associated with the moving piston 466 penetrating the offset tubing section.

Turning to FIG. 15, a third embodiment of a receiver deployment section 500 in accordance with the present invention is shown. The view depicted in FIG. 15 is as side elevation sectional view, and is essentially the same view as depicted in FIG. 14, except that the details of the receiver deployment section 500 of FIG. 15 are different than the details of the receiver deployment section 400 of FIG. 14. The receiver array is supported by tubing 40, which incorporates an offset tubing section 440. A receiver or geophone pod 20 is positioned adjacent the offset tubing section 440, and is connected to the receiver array by signal cable 114.

Attached to the offset tubing section 440 is a geophone pod housing member 540. As depicted, the geophone pod 20 is in a second or deployed position in which the pod is in contact with the wall 3 of the wellbore 5. In a first or non-deployed position the geophone pod 20 is retracted to the left, towards the offset tubing section 440. In the retracted position the geophone pod housing ("receiver housing") 540 provides mechanical protection for the geophone pod 20. The signal cable 114 is further supported by the geophone pod housing 540 by cable supports 548 which allow the cable to move with respect to the housing 540. Sufficient slack is provided in the signal cable 114 to allow the geophone pod, to which the cable is attached, to move freely from the non-deployed position (not shown) to the deployed position (shown).

The receiver deployment section further includes a first piston 554 and a second piston 556, which each have a first end in contact with the geophone pod 20. The main body of each piston is disposed through a respective first and second opening in the offset tubing section 440 of the fluid conduit 40, as well as through the geophone pod housing member 540. A second end of each piston 554 and 556, which is located inside (i.e., within the interior) of the offset tubing section, has respective flanges 558 and 560 which prevent the pistons from passing beyond the offset tubing section 440. The pistons 554 and 556 are sealed within the openings in the pod housing member 540 by seals 552. Seals 552 allow the pistons to move within the openings in the offset tubing section 440 and the pod housing 540, but restrict fluid flow between the interior of the offset tubing section and the wellbore.

When the receiver array is deployed in the wellbore, the geophone pod 20 is in a retracted position (not shown) wherein the pod 20 is positioned to the left of the position depicted in FIG. 15. In this retracted position, the pistons 554 and 556 are also positioned to the left of the position shown. When the geophone pod 20 is to be deployed and coupled to the wall 3 of the wellbore 5, fluid pressure within the conduit 40, and hence the offset tubing section 440, is increased until the differential pressure between the interior and the exterior of the fluid conduit generates sufficient force on the flanges 558 and 560 of the pistons 554 and 556 to cause them to move to the right (as depicted). When this condition is met the pistons 554 and 556 push the geophone pod 20 to the right (i.e., to the position depicted in FIG. 15) until the geophone pod either couples with the wall 3 of the wellbore, or the maximum allowable travel of the pistons is achieved.

The pistons 554 and 556 can be connected to the geophone pod 20 (as opposed to merely resting in contact with the pod) such that the geophone pod can be retracted by decreasing the pressure in the conduit 40 until pressure within the wellbore 5 overcomes any frictional resistance between the pistons and the seals 552, and the pistons are pushed back into the offset tubing section 440.

Turning now to FIG. 16, a fourth embodiment of a receiver deployment section 600 in accordance with the present invention is shown. The view depicted in FIG. 16 is as side elevation sectional view, and is essentially the same view as depicted in FIGS. 14 and 15, except that the details of the receiver deployment section 600 of FIG. 16 are different than the details of the receiver deployment sections 400 and 500 of respective FIGS. 14 and 15. The receiver array is supported by tubing 40, which incorporates an offset tubing section 440. A geophone pod 20 is positioned adjacent the offset tubing section 440, and is connected to the receiver array by signal cable 114.

Attached to the offset tubing section 440 is a geophone pod housing member 660 (a "receiver housing"). As depicted, the geophone pod 20 is in a second or deployed position in which the pod is in contact with the wall 3 of the wellbore 5. In a first or non-deployed position the geophone pod 20 is retracted to the left, towards the offset tubing section 440. In the retracted position the geophone pod housing 660 provides mechanical protection for the geophone pod 20. The signal cable 114 is further supported by the geophone pod housing 660 by cable supports 648 which allow the cable 114 to move with respect to the housing 660. Sufficient slack is provided in the signal cable 114 to allow the geophone pod, to which the cable is attached, to move freely from the non-deployed position (not shown) to the deployed position (shown).

The receiver deployment section 600 further includes first and second clamping arms 670 and 672, which each have a first end pivotally attached to the pod housing 660 at first pivot connections 674. A second end of each clamping arms is pivotally attached at second pivot connections 678 to first and second connector pads 673, which are in turn connected to the geophone pod 20. First and second pistons, 654 and 656, are deployed with respect to the offset tubing section 440 and the geophone pod housing 660 in a manner similar to the pistons 554 and 556 of FIG. 15. That is, pistons 654 and 656 are disposed through first and second openings in the offset tubing section and the geophone pod housing 660. The pistons are defined by first and second ends. The second ends of the pistons are located within the offset tubing section 440. These second ends of the pistons 654 and 656 are provided with respective flanges 658 and 662 which arrest right-ward movement (as viewed in FIG. 16) of the pistons with respect to the offset tubing section Further, seals 652 aid in resisting fluid movement around the pistons between the wellbore 5 and the inside of the conduit 40.

However, unlike the pistons 554 and 556 depicted in FIG. 15, which are connected directly to the geophone pod 20, the pistons 654 and 656 of FIG. 16 have first ends which are pivotally attached to respective clamping arms 670 and 672 at respective third pivot connections 676 and 678. In this way, as the pistons are moved rightward to the "deployed" position depicted in FIG. 16, the clamping arms 670 and 672 pivot about first pivot connections 674, and push the geophone pod 20 into contact with the wall 3 of the wellbore 5 (or at least until the movement of the clamping arms is restricted by the flanges 658 and 662 connecting with the inner wall of the offset tubing section 440).

As with the receiver deployment section 500 of FIG. 15, the receiver deployment section 600 of FIG. 16 is actuated by an increase of pressure within the conduit 40 (and the offset tubing section 440). As the differential pressure between the interior and exterior of the fluid conduit 40 (and offset tubing section 440) increases, the force on the flanges 658 and 662 increases until the pistons 654 and 656 push on the clamping arms 670 and 672 cause the geophone pod to move to the deployed position (depicted in FIG. 16). By reducing the pressure within the offset tubing section, the external forces acting on the geophone pod 20 push the pistons 654 and 656 back to the left (as viewed in FIG. 16), and the pod 20 is retracted.

Operation

Returning to FIG. 1, as described previously, the apparatus is preferably actuated by inflating the expansible sections 50 to cause the receivers 20 to be pressed against the casing 5. This can be accomplished by increasing the pressure within the fluid conduit 40 to a pressure beyond that inside the wellbore 4, thus causing the expansible sections to expand. In a first embodiment, a static fluid can be maintained within the fluid conduit 40 having a pressure maintained by a pressure source 7 of FIG. 1 which can comprise a pump or a compressor.

More preferably, a fluid is circulated within the fluid conduit 40. In this embodiment, the lower-most end 126 of the fluid conduit 40 is provided with a flow restrictor 15. The flow restrictor can comprise a valve configured to close when the pressure within the fluid conduit rises to a certain preselected pressure. More preferably, the flow restrictor 15 comprises a fused valve configured to close at a preselected differential pressure between the pressure within the fluid conduit 40 and the wellbore 4. The apparatus 100 can be actuated by increasing the pressure of fluid within the fluid conduit 40 by fluid pressure source 7 for example. The fused valve 15 advantageously provides a fast acting response to pressure increases within the fluid conduit 40. When the expansible sections 50 have been actuated, the receivers are caused to move towards the casing 5 as shown in FIG. 6. Once the pressure within the fluid conduit 40 drops below a preselected pressure differential with the pressure in the wellbore 4, the fused valve 15 opens allowing fluid to be circulated through the fluid conduit 40.

When the apparatus is deployed in a reservoir in which the borehole is filled with a liquid fluid, it is preferable to use the same liquid fluid within the fluid conduit as the working fluid in the wellbore to expand the expansible sections. This provides a pressure balanced system prior to closing the valve 15, which is beneficial to the proper functioning of the packers 52. In other applications, the apparatus can be deployed within a wellbore in which a gaseous fluid is contained, as for example in a natural gas field. In this application, it is preferably to use a gaseous fluid within the fluid conduit as the working fluid to expand the expansible sections.

Figure 17:
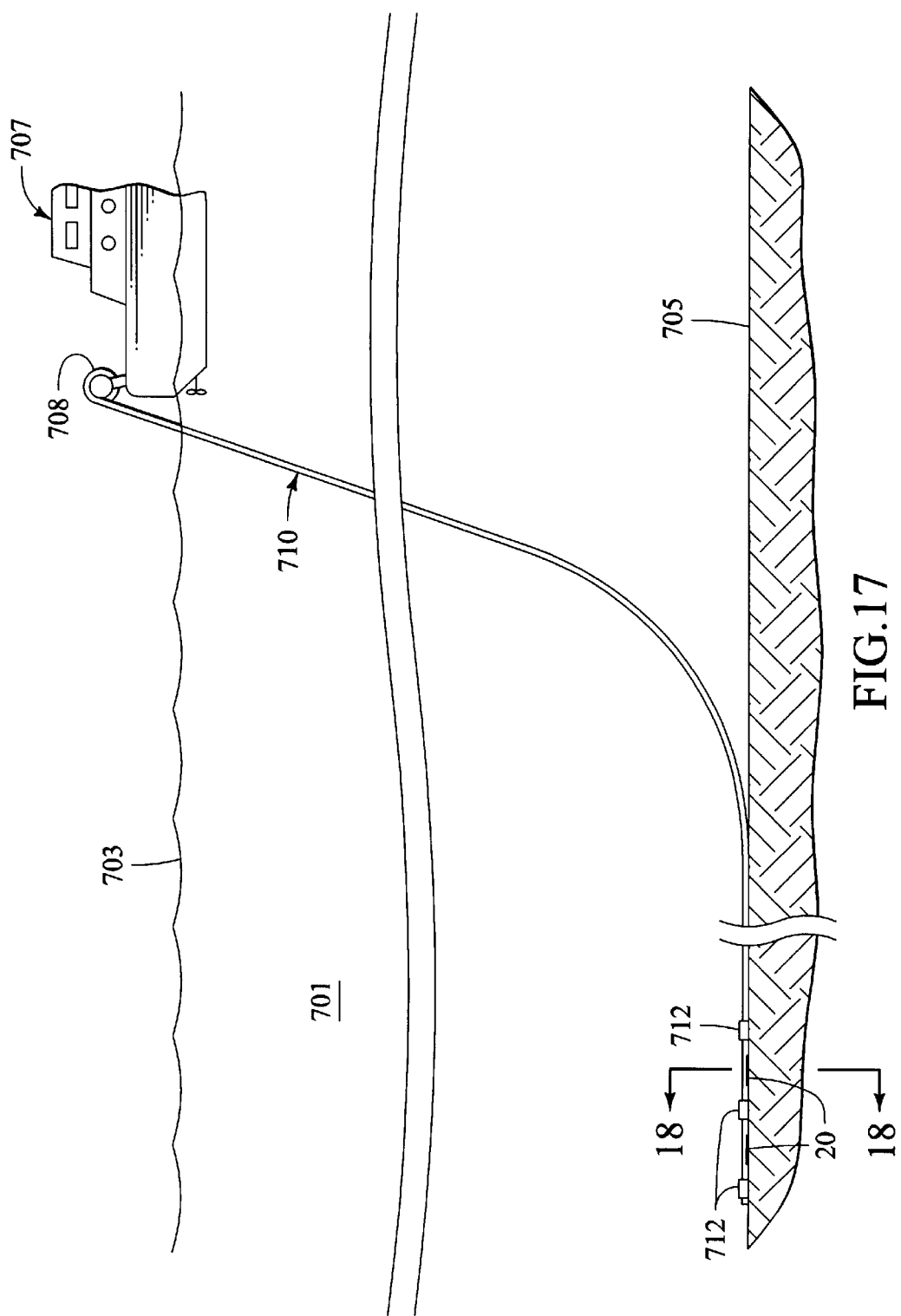
FIG. 17 is a side elevation view of an apparatus in accordance with the present invention deployed on a bottom surface in a marine environment.

Turning to FIG. 17, a method of deploying a receiver array of the present invention on the bottom of a lake or an ocean floor is depicted. The view in FIG. 17 is a side elevation view of a body of water 701, such as an ocean, having an upper surface 703 and defined by an essentially horizontal bottom surface 705. In this application the receiver array 710 can be deployed from a water craft 707 by a deployment apparatus 708. Unlike the applications discussed previously wherein a receiver array is disposed within a wellbore, in the application depicted in FIG. 17 the portion of the receiver array containing the receivers or geophones rests directly on the bottom surface 705. This application is an alternative to using towed arrays of geophones (i.e., an array of geophones towed in the water behind a boat). The advantage of the deployment method depicted in FIG. 17 is that the geophones are in direct contact with the bottom surface 705, and thus a better signal can be received, since the signal will not be attenuated by the body of water, as is the case when using a towed array.

As depicted, the receiver array 710 of FIG. 17 comprises a plurality of geophone pods 20. The geophone pods 20 can be supported in the array in any of the manners disclosed herein above. Further, the receiver deployment section used to move the geophone pods into a position to contact the bottom surface can be any of the receiver deployment sections disclosed herein. In the example depicted in FIG. 17, the receiver array has a cross section similar to the receiver array depicted in FIG. 12. That is, the receiver array uses an expansible section as the receiver deployment section. The array 710 further includes locators 712, which facilitate in properly orienting the geophone pods 20 with respect to the bottom surface 705.

Figure 18:
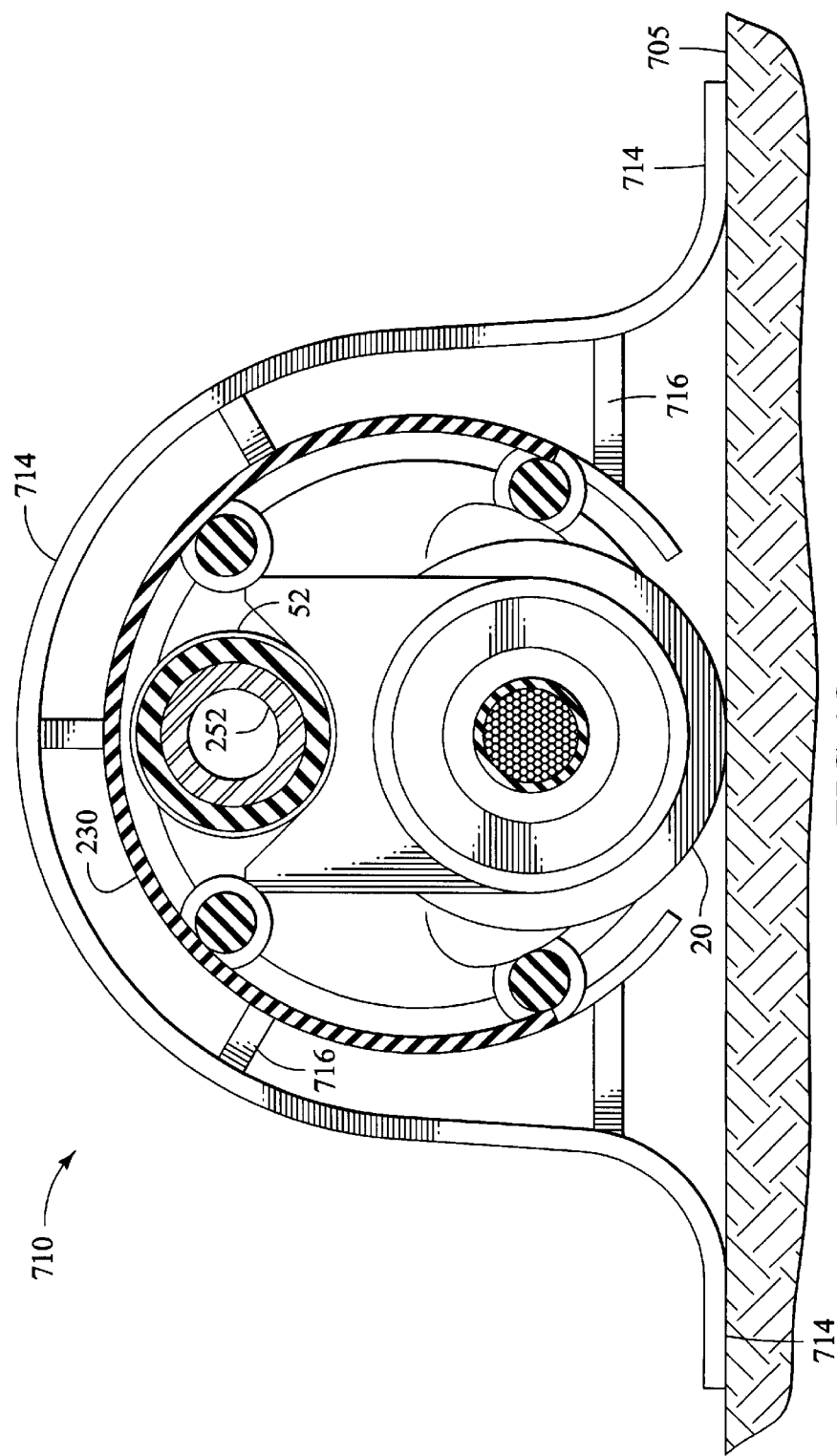
FIG. 18 is a side elevation sectional view of the apparatus depicted in FIG. 17.

Turning now to FIG. 18, a side sectional view of the receiver array 710 of FIG. 17 is depicted. In the view depicted in FIG. 18, the geophone pod has been deployed (as evidenced by the expanded expansible section 52) and is in contact with the bottom surface 705. The locator 712 is connected to the geophone pod housing 230 by brackets 716. The locator can comprise a central curved or circular section which will allow the receiver array 710 to roll on the bottom surface 705. The locator can also include "feet" 714, which arrest the geophone pod 20 in a predetermined position where the pod can contact the bottom surface 705 when the pod is deployed from the pod housing 230. The receiver array 710 can further include sensors (not shown) which are connected to the signal cable and can signal when the receiver array is properly oriented with respect to the bottom surface 705.

In compliance with the statute, the invention has been described in language more or less specific as to structural and methodical features.

It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An apparatus for detecting geophysical energy, comprising:
   a receiver configured to receive geophysical energy characterized by a plurality of characteristics, and convert said geophysical energy into a signal representative of at least one characteristic of said geophysical energy;
   a signal transport device configured to accept said signal and relay said signal to a remote location;
   a fluid conduit configured to contain a pressurized fluid, the fluid conduit defining an interior and an exterior;
   a receiver deployment section configured to be actuated in response to an increase of fluid pressure within said conduit, and when actuated, to cause the receiver to be moved from a first position to a second position;
   a spring disposed between the conduit and the receiver and configured to bias the receiver away from the conduit to the second position;
   a releasable latch for temporarily securing the receiver in the first position; and
   a latch release device configured to release the latch in response to pressure within the conduit.

2. The apparatus of claim 1, and wherein:
   the latch is pivotally mounted and is configured to release the receiver when the latch is pivoted; and
   the latch release device comprises a piston movably disposed through an opening in the conduit, the piston having a first end configured to push the latch and cause it to pivot when the piston is moved in the opening in the conduit, and wherein the piston moves within the opening in the conduit as a result of a differential pressure between the interior and the exterior of the conduit.

3. The apparatus of claim 1, and wherein:

the latch is electrically actuated in response to an actuation signal; and the latch release device comprises a pressure switch within the interior of the conduit, the pressure switch configured to generate the actuation signal in response to a predetermined pressure within the interior of the conduit.

4. An apparatus for detecting geophysical energy, comprising:

a receiver configured to receive geophysical energy characterized by a plurality of characteristics, and convert said geophysical energy into a signal representative of at least one characteristic of said geophysical energy;

a signal transport device configured to accept said signal and relay said signal to a remote location;

a fluid conduit configured to contain a pressurized fluid, the fluid conduit defining an interior and an exterior; and a receiver deployment section configured to be actuated in response to an increase of fluid pressure within said conduit, and when actuated, to cause the receiver to be moved from a first position to a second position, and wherein the receiver deployment section comprises a first piston movably disposed through a first opening in the conduit, the first piston having a first piston first end configured to contact the receiver and to move the receiver from the first position to the second position when the first piston is moved in the first opening in the conduit, and wherein the first piston moves within the first opening in the conduit as a result of a differential pressure between the interior and the exterior of the conduit.

5. The apparatus of claim 4, and wherein the receiver deployment section further comprises a second piston movably disposed through a second opening in the conduit, the second piston having a second piston first end configured to contact the receiver and to move the receiver from the first position to the second position when the second piston is moved in the second opening in the conduit, and wherein the first piston moves within the second opening in the conduit as a result of a differential pressure between the interior and the exterior of the conduit.

6. The apparatus of claim 4, and wherein the apparatus further comprises a receiver housing attached to the fluid conduit and configured to receive at least part of the receiver when the receiver is in the first position.

7. An apparatus for detecting geophysical energy, comprising:

a receiver configured to receive geophysical energy characterized by a plurality of characteristics, and convert said geophysical energy into a signal representative of at least one characteristic of said geophysical energy;

a signal transport device configured to accept said signal and relay said signal to a remote location;

a fluid conduit configured to contain a pressurized fluid, the fluid conduit defining an interior and an exterior; and a receiver deployment section configured to be actuated in response to an increase of fluid pressure within said conduit, and when actuated, to cause the receiver to be moved from a first position to a second position, and wherein the receiver deployment section comprises:

a receiver housing attached to the fluid conduit and configured to receive at least part of the receiver when the receiver is in the first position;

a first connector pad connected to the receiver;

a first clamping arm defined by a first end and second end, the first clamping arm first end being pivotally attached to the receiver housing, and the first clamping arm second end being pivotally attached to the first connector pad; and a first piston movably disposed through a first opening in the conduit, the first piston having a first end configured to contact the first clamping arm and to move the first clamping arm when the first piston is moved in the first opening in the conduit, and wherein the first piston moves within the first opening in the conduit as a result of a differential pressure between the interior and the exterior of the conduit.

8. The apparatus of claim 7, and wherein the receiver deployment section further comprises:

a second connector pad connected to the receiver;

a second clamping arm defined by a first end and second end, the second clamping arm first end being pivotally attached to the receiver housing, and the second clamping arm second end being pivotally attached to the second connector pad; and a second piston movably disposed through a second opening in the conduit, the second piston having a first end configured to contact the second clamping arm and to move the second clamping arm when the first piston is moved in the first opening in the conduit, and wherein the second piston moves within the second opening in the conduit as a result of a differential pressure between the interior and the exterior of the conduit.

9. An apparatus for detecting geophysical energy, comprising:

a receiver configured to receive geophysical energy characterized by a plurality of characteristics, and convert said geophysical energy into a signal representative of at least one characteristic of said geophysical energy;

a signal transport device configured to accept said signal and relay said signal to a remote location;

a fluid conduit configured to contain a pressurized fluid, the fluid conduit defining an interior and an exterior;

a receiver deployment section configured to be actuated in response to an increase of fluid pressure within said conduit, and when actuated, to cause the receiver to be moved from a first position to a second position; and a locator attached to the fluid conduit, the locator being configured to orient the receiver into a predetermined position with respect to an essentially horizontal surface upon which the apparatus may rest.

10. The apparatus of claim 9, and wherein the locator comprises a curved section to allow the apparatus to roll on the surface upon which the apparatus may rest, and a foot to arrest the apparatus when the receiver is oriented in the predetermined position.

11. An apparatus for detecting geophysical energy, comprising:

a receiver configured to receive geophysical energy characterized by a plurality of characteristics, and convert said geophysical energy into a signal representative of at least one characteristic of said geophysical energy;

a signal transport device configured to accept said signal and relay said signal to a remote location;

a fluid conduit configured to contain a pressurized fluid, the fluid conduit defining an interior and an exterior;

a receiver deployment section configured to be actuated in response to an increase of fluid pressure within said conduit, and when actuated, to cause the receiver to be moved from a first position to a second position;

a receiver housing attached to the fluid conduit and configured to receive at least part of the receiver when the receiver is in the first position; and a locator attached to the receiver housing, the locator being configured to orient the receiver into a predetermined position with respect to an essentially horizontal surface upon which the apparatus may rest.

12. The apparatus of claim 11, and wherein the locator comprises a curved section to allow the apparatus to roll on the surface upon which the apparatus may rest, and a foot to arrest the apparatus when the receiver is oriented in the predetermined position.

13. An apparatus for detecting geophysical energy, comprising:

a receiver configured to receive geophysical energy characterized by a plurality of characteristics, and convert said geophysical energy into a signal representative of at least one characteristic of said geophysical energy;

a signal transport device configured to accept said signal and relay said signal to a remote location;

a fluid conduit configured to contain a pressurized fluid, the fluid conduit defining an interior and an exterior; and a receiver deployment section configured to be actuated in response to an increase of fluid pressure within said conduit, and when actuated, to cause the receiver to be moved from a first position to a second position, and wherein at least a part of the fluid conduit comprises an offset tubing section, and further wherein the receiver deployment section is disposed between the offset tubing section and the receiver.

14. An apparatus for detecting geophysical energy, comprising:

a receiver configured to receive geophysical energy characterized by a plurality of characteristics, and convert said geophysical energy into a signal representative of at least one characteristic of said geophysical energy;

a signal transport device configured to accept said signal and relay said signal to a remote location;

a fluid conduit configured to contain a pressurized fluid, the fluid conduit defining an interior and an exterior; and a receiver deployment section configured to be actuated in response to an increase of fluid pressure within said conduit, and when actuated, to cause the receiver to be moved from a first position to a second position, and wherein said signal transport device comprises a signal cable comprising a signal conductor, said signal cable being connected to said receiver.

15. An apparatus for detecting geophysical energy, comprising:

a receiver configured to receive geophysical energy characterized by a plurality of characteristics, and convert said geophysical energy into a signal representative of at least one characteristic of said geophysical energy;

a signal transport device configured to accept said signal and relay said signal to a remote location;

a fluid conduit configured to contain a pressurized fluid, the fluid conduit defining an interior and an exterior; and a receiver deployment section configured to be actuated in response to an increase of fluid pressure within said conduit, and when actuated, to cause the receiver to be moved from a first position to a second position, and wherein said receiver comprises a geophone configured to record at least three of said characteristics.

16. An apparatus for detecting geophysical energy, comprising:

a receiver configured to receive geophysical energy characterized by a plurality of characteristics, and convert said geophysical energy into a signal representative of at least one characteristic of said geophysical energy;

a signal transport device configured to accept said signal and relay said signal to a remote location;

a fluid conduit configured to contain a pressurized fluid, the fluid conduit defining an interior and an exterior; and a receiver deployment section configured to be actuated in response to an increase of fluid pressure within said conduit, and when actuated, to cause the receiver to be moved from a first position to a second position, and wherein said fluid conduit comprises standard production tubing.

17. An apparatus for detecting geophysical energy, comprising:

a receiver configured to receive geophysical energy characterized by a plurality of characteristics, and convert said geophysical energy into a signal representative of at least one characteristic of said geophysical energy;

a signal transport device configured to accept said signal and relay said signal to a remote location;

a fluid conduit configured to contain a pressurized fluid, the fluid conduit defining an interior and an exterior;

a receiver deployment section configured to be actuated in response to an increase of fluid pressure within said conduit, and when actuated, to cause the receiver to be moved from a first position to a second position; and a plurality of receivers in spaced-apart relationship, said fluid conduit further comprising a plurality of receiver deployment sections in spaced apart relationship, individual said receivers being located proximate individual said receiver deployment sections.

18. The apparatus of claim 17 wherein said signal transport device comprises a signal cable comprising a signal conductor, said signal cable being connected to each said receiver.

19. The apparatus of claim 17 wherein said signal transport device comprises a plurality of signal cables, each said signal cable comprising a signal conductor, a first one of said signal cables being connected to a first plurality of said receivers, and a second one of said signal cables being connected to a second plurality of said receivers.

20. The apparatus of claim 17 wherein said fluid conduit further comprises standard production tubing sections, individual standard production tubing sections being disposed between individual said receiver deployment sections.

21. A marine bottom surface acoustic receiver array, comprising:

a plurality of seismic energy receivers, individual said receivers configured to receive geophysical energy characterized by a plurality of characteristics and convert said geophysical energy into signals representative of at least one characteristic of said geophysical energy;

a signal cable configured to accept said signals and relay said signals to a remote location;

a fluid conduit configured to contain a pressurized fluid, said conduit comprising receiver deployment sections located proximate to individual said receivers, said individual receiver deployment sections configured to be actuated in response to an increase of fluid pressure within said conduit, and when actuated, to cause the receiver to be moved from a first position to a second position to contact the marine bottom surface;

a fluid pressure source configured to increase pressure of fluid which can be contained within said conduit;

a plurality of receiver housings attached to the fluid conduit, each receiver housing configured to receive at least part of one of the receivers when the receiver is in the first position; and a plurality of locators attached to dedicated ones of the receiver housings, the locators being configured to orient the receivers into a predetermined position with respect to the marine bottom surface.

* * * * *